US010772085B2

United States Patent
Yin et al.

(10) Patent No.: US 10,772,085 B2
(45) Date of Patent: Sep. 8, 2020

(54) SHORT PUCCH FORMATS AND SCHEDULING REQUEST (SR) TRANSMISSION FOR 5TH GENERATION (5G) NEW RADIO ACCESS TECHNOLOGY (NR)

(71) Applicants: Sharp Kabushiki Kaisha, Sakai-ku, Sakai, Osaka (JP); FG Innovation Company Limited, Hong Kong (CN)

(72) Inventors: Zhanping Yin, Vancouver, WA (US); Toshizo Nogami, Chiba (JP)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/970,091

(22) Filed: May 3, 2018

(65) Prior Publication Data
US 2018/0324787 A1    Nov. 8, 2018

Related U.S. Application Data

(63) Continuation of application No. PCT/US2018/030685, filed on May 2, 2018.
(Continued)

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1861* (2013.01); *H04L 5/0053* (2013.01); *H04W 74/004* (2013.01)

(58) Field of Classification Search
CPC ............ H04W 74/004; H04W 72/0413; H04L 1/1861; H04L 5/0053
(Continued)

(56) References Cited

U.S. PATENT DOCUMENTS 9,755,871 B1 *   9/2017  Lee ..................... H04L 25/0204
2010/0040005 A1   2/2010  Kim et al.
(Continued)

OTHER PUBLICATIONS

Seonwook Kim, Suckchel Yang, Yunjung Yi, Jaehyung Kim, Changhwan Park and Joonkui Ahn;Uplink Control Channel Transmission for New Rat; (Year: 2017).*
MCC Support, "Draft Report of 3GPP TSG RAN WG1 #88bis v0.1.0 (Spokane, USA, Apr. 3-7, 2017)" 3GPP TSG RAN WG1 Meeting #89, Hangzhou, China, R1-17xxxxx May 19, 2017.
LG Electronics, "Evaluation results on short NR-PUCCH types", 3GPP TSG RAN WG1 Meeting #88bis, Spokane, USA, R1-1704908, Apr. 7, 2017.
(Continued)

*Primary Examiner* — Phong La
(74) *Attorney, Agent, or Firm* — Austin Rapp

(57) ABSTRACT

A user equipment (UE) is described. The UE includes a processor and memory in electronic communication with the processor. Instructions stored in the memory are executable to determine a physical uplink control channel (PUCCH) resource and a PUCCH format. The instructions are also executable to transmit uplink control information (UCI) on the PUCCH resource using the PUCCH format. If the PUCCH format is a 2-symbol short PUCCH, 1-symbol PUCCH structure is used in each symbol, and if the UCI is up to 2 bits, the UCI is repeated in two symbols using repetition of a 1-symbol PUCCH. If the PUCCH format is a 2-symbol short PUCCH, and if the UCI is more than 2 bits, the UCI is jointly encoded, and the encoded UCI bits are distributed across two symbols.

4 Claims, 20 Drawing Sheets

Related U.S. Application Data

(60) Provisional application No. 62/501,305, filed on May 4, 2017.

(51) Int. Cl.
  H04W 74/00 (2009.01)
  H04L 5/00 (2006.01)

(58) Field of Classification Search
  USPC .......................................................... 370/329
  See application file for complete search history.

(56) References Cited

U.S. PATENT DOCUMENTS

| | | |
|---|---|---|
| 2010/0246463 A1 | 9/2010 | Papasakellariou et al. |
| 2012/0082157 A1* | 4/2012 | Yamada ................ H04L 1/0073 |
| | | 370/389 |
| 2012/0087254 A1 | 4/2012 | Yin et al. |
| 2012/0207109 A1 | 8/2012 | Pajukoski et al. |
| 2014/0233419 A1* | 8/2014 | Cheng .................. H04L 5/0053 |
| | | 370/252 |
| 2018/0020434 A1* | 1/2018 | Shao ..................... H04W 72/04 |
| 2018/0176909 A1* | 6/2018 | Wikstrom ......... H04W 72/0446 |
| 2018/0310298 A1* | 10/2018 | Li ......................... H04L 1/1812 |
| 2018/0331807 A1* | 11/2018 | Kim |
| 2019/0028162 A1* | 1/2019 | Lee .................... H04W 72/0413 |
| 2019/0036656 A1* | 1/2019 | Berggren ................ H04L 5/001 |
| 2019/0098622 A1* | 3/2019 | Lee ..................... H04W 72/042 |
| 2019/0141700 A1* | 5/2019 | Kwak ............... H04W 72/0413 |

OTHER PUBLICATIONS

ZTE, ZTE Microelectronics, "NR PUCCH structure in short duration", 3GPP TSG RAN WG1 Meeting #88, Athens, Greece, R1-1701590, Feb. 17, 2017.

NTT Docomo, Inc., "Sequence-based PUCCH vs DMRS-based PUCCH", 3GPP TSG RAN WG1 Meeting #88bis, Spokane, USA, R1-1705739, Apr. 7, 2017.

NTT Docomo, Inc., "PUCCH in short duration", 3GPP TSG RAN WG1 Meeting #88bis, Spokane, USA, R1-1705740, Apr. 7, 2017.

International Search Report and Written Opinion issued for PCT Application No. PCT/US2018/030685 dated Aug. 17, 2018.

Qualcomm Incorporated, "Channelization of short PUCCH", 3GPP TSG RAN WG1 Meeting #88bis, Spokane, USA, R1-1705610, Apr. 7, 2017.

LG Electronics et al., "WF on 1-symbol NR-PUCCH", 3GPP TSG RAN WG1 Meeting #88bis, Spokane, USA, R1-1706604, Apr. 7, 2017.

ZTE, ZTE Microelectronics et al., "WF on NR PUCCH short format with one symbol", 3GPP TSG RAN WG1 Meeting #88bis, Spokane, USA, R1-1706634, Apr. 7, 2017.

Qualcomm, ZTE et al., "WF on waveform for UL short PUCCH", 3GPP TSG RAN WG1 Meeting #88bis, R1-1706616, Apr. 7, 2017.

Intel et al., "WF on 1-symbol short PUCCH with 2 UCI bits," 3GPP TSG-RAN WG1 Meeting #88, Spokane, USA, R1-1706612, Apr. 7, 2017.

LG Electronics, "Design of short NR-PUCCH format", 3GPP TSG RAN WG1 Meeting #88bis, Spokane, USA, R1-1704907, Apr. 7, 2017.

* cited by examiner

SHORT PUCCH FORMATS AND SCHEDULING REQUEST (SR) TRANSMISSION FOR 5TH GENERATION (5G) NEW RADIO ACCESS TECHNOLOGY (NR)

RELATED APPLICATIONS

This application is related to and claims priority from U.S. Provisional Patent Application No. 62/501,305, entitled "SHORT PUCCH FORMATS AND SCHEDULING REQUEST (SR) TRANSMISSION FOR 5th GENERATION (5G) NEW RADIO ACCESS TECHNOLOGY (NR)," filed on May 4, 2017, which is hereby incorporated by reference herein, in its entirety.

TECHNICAL FIELD

The present disclosure relates generally to communication systems. More specifically, the present disclosure relates to short physical uplink control channel (PUCCH) formats and scheduling request (SR) transmission for 5th generation (5G) new radio access technology (NR).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
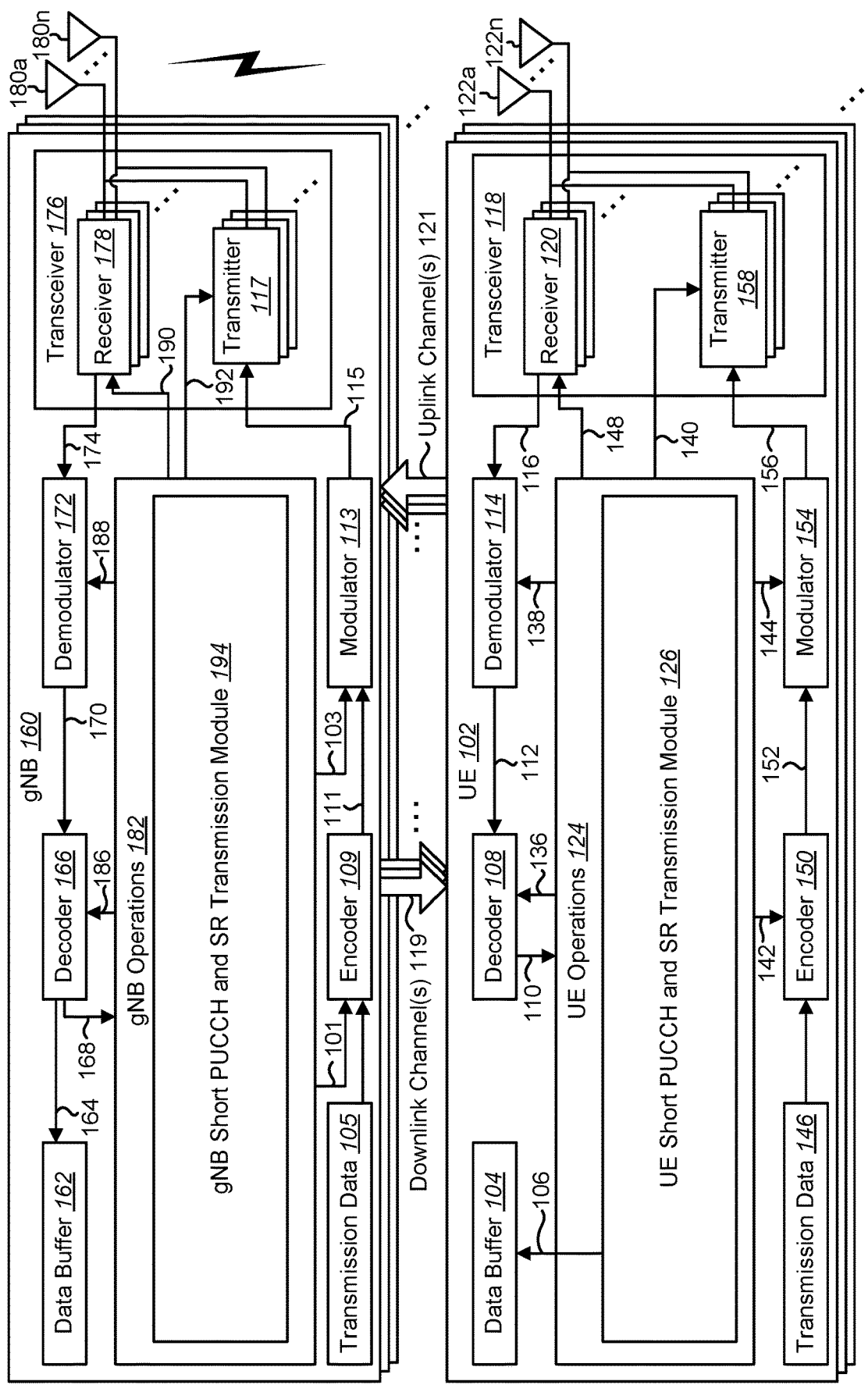
FIG. 1 is a block diagram illustrating one implementation of one or more base stations (gNBs) and one or more user equipments (UEs) in which short physical uplink control channel (PUCCH) formats and scheduling request (SR) transmission for 5th generation (5G) new radio access technology (NR) may be implemented.

A user equipment (UE) is described. The UE includes a processor and memory in electronic communication with the processor. Instructions stored in the memory are executable to determine a physical uplink control channel (PUCCH) resource and a PUCCH format. The instructions are also executable to transmit uplink control information (UCI) on the PUCCH resource using the PUCCH format. If the PUCCH format is a 2-symbol short PUCCH, 1-symbol PUCCH structure is used in each symbol, and if the UCI is up to 2 bits, the UCI is repeated in two symbols using repetition of a 1-symbol PUCCH. If the PUCCH format is a 2-symbol short PUCCH, and if the UCI is more than 2 bits, the UCI is jointly encoded, and the encoded UCI bits are distributed across two symbols.

A base station is also described. The base station includes a processor and memory in electronic communication with the processor. Instructions stored in the memory are executable to determine a PUCCH resource and a PUCCH format. The instructions are also executable to receive UCI on the PUCCH resource using the PUCCH format. If the PUCCH format is a 2-symbol short PUCCH, 1-symbol PUCCH structure is used in each symbol, and if the UCI is up to 2 bits, the UCI is repeated in two symbols using repetition of a 1-symbol PUCCH. If the PUCCH format is a 2-symbol short PUCCH, and if the UCI is more than 2 bits, the UCI is jointly encoded, and the encoded UCI bits are distributed across two symbols.

A method for a UE is also described. The method includes determining a PUCCH resource and a PUCCH format. The method also includes transmitting UCI on the PUCCH resource using the PUCCH format. If the PUCCH format is a 2-symbol short PUCCH, 1-symbol PUCCH structure is used in each symbol, and if the UCI is up to 2 bits, the UCI is repeated in two symbols using repetition of a 1-symbol PUCCH. If the PUCCH format is a 2-symbol short PUCCH, and if the UCI is more than 2 bits, the UCI is jointly encoded, and the encoded UCI bits are distributed across two symbols.

A method for a base station is also described. The method includes determining a PUCCH resource and a PUCCH format. The method also includes receiving UCI on the PUCCH resource using the PUCCH format. If the PUCCH format is a 2-symbol short PUCCH, 1-symbol PUCCH structure is used in each symbol, and if the UCI is up to 2 bits, the UCI is repeated in two symbols using repetition of a 1-symbol PUCCH. If the PUCCH format is a 2-symbol short PUCCH, and if the UCI is more than 2 bits, the UCI is jointly encoded, and the encoded UCI bits are distributed across two symbols.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. A new radio base station may be referred to as a gNB. A gNB may also be more generally referred to as a base station device.

In LTE, a separate physical uplink control channel (PUCCH) resource is configured for scheduling request (SR) transmission. The SR is one type of Uplink Control Information (UCI). In connected mode, the UE may send an SR to the base station (e.g., a gNB), to request for scheduling of an uplink (UL) data transmission. The SR in LTE is only 1 bit, and can be indicated by a transmission on an SR resource or in a joint report with other UCI on a PUCCH.

In NR, multiple short PUCCH formats and multiple long PUCCH formats may be defined, and the PUCCH formats of a UE may be configured by a base station. Also, the SR may be enhanced to support multiple bits (e.g., to indicate the priority of a pending traffic).

Similar to LTE, the SR may be configured with independent PUCCH resources in NR. If there is no SR, no signal is transmitted on the SR resource. If there is an SR, the SR transmission depends on whether there is other UCI to be reported in the same slot.

NR may define multiple PUCCH formats, including PUCCH in short duration and PUCCH in long duration. How to configure the format and resources for SR transmissions in NR is not discussed or specified yet in 3GPP.

Potential SR formats and resource configurations are described herein. For an SR-only transmission, the SR may be transmitted with the configured format on the configured resource.

Different cases of SR collision with other UCI on a physical uplink control channel (PUCCH) are also described herein. To report SR and HARQ-ACK together, the SR format or PUCCH format may be adapted to a higher payload format in some cases. Methods of control channel transmission following priority rules with channel dropping or power scaling are also described herein.

In NR, multiple short PUCCH formats and multiple long PUCCH formats may be defined, and the PUCCH formats of a UE may be configured by a base station. The SR may be configured with a defined PUCCH format. The SR format and resource allocations may be different from normal PUCCH.

Implementations of the SR channel format and resource allocation are described herein. SR formats and resources with 1 bit may be configured separately for traffics with different priorities. SR formats and resources with more than 1 bit may be configured to indicate the priority of pending traffic. The SR resource may be configured with 1-symbol PUCCH format based on sequence selection. The set of sequences for the SR resource depends on the number of bits of a SR report. The SR resource may be configured with 1-symbol PUCCH format based on RS and UCI multiplexing with 6 RS and 6 UCI carrying REs in each RB. The SR resource may be configured with 2-symbol PUCCH format by repeating the same UCI on two symbols with frequency hopping to provide diversity. The SR resource may be configured with long PUCCH format.

Channel collision between SR and other PUCCH carrying other UCI (e.g., HARQ-ACK) is also described herein. In a case of a full overlap of SR and HARQ-ACK transmission, if the PUCCH resource for HARQ-ACK supports more than 2 bits, the SR bits may be appended to the HARQ-ACK bit, and then joint coded and reported on the PUCCH resource for HARQ-ACK. However, in a case of 1 or 2 bits of HARQ-ACK and multiple bit SR transmissions, there is no space to carry extra information on a single PUCCH. Furthermore, because the SR resource may have a different length from other PUCCH transmission, joint reporting of SR with HARQ-ACK is not always possible due to timing issues.

Therefore, new methods are described to support simultaneous UCI transmission. In one method, PUCCH format adaptation may be applied. A UE may be configured with multiple PUCCH resources with different maximum payload sizes. In case of simultaneous HARQ-ACK and SR transmissions, a PUCCH resource with higher payload may be used instead of the default PUCCH resource with 1 or 2 bits payload. The existing PUCCH format and resource for 1 or 2 bits may be adapted to a PUCCH format with higher payload at the same RB resources. In RS and UCI multiplexing case, a different RS pattern and overhead may be used.

In another method, simultaneous PUCCH transmissions may be supported. This is not limited to SR and HARQ-ACK, but also to other collision cases such as HARQ-ACK and Channel State Information (CSI) feedback. The number of simultaneous PUCCH transmission can be limited to two.

In a power limited case, power scaling may be applied based on a priority rule defined by UCI type and traffic priority.

In yet another method, only one PUCCH channel is transmitted. Channel dropping is applied based on a priority rule defined by UCI type and traffic priority. The priority rule may be defined as follows from highest to lowest: HARQ-ACK for high priority traffic (e.g., URLLC); SR with high priority (e.g., URLLC); HARQ-ACK for other traffic (e.g., eMBB); SR with low priority (e.g., eMBB); CSI for high priority channel (e.g., URLLC); CSI for low priority channel (e.g., eMBB); Uplink data (i.e., PUSCH).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which short physical uplink control channel (PUCCH) formats and scheduling request (SR) transmission for 5th generation (5G) new radio access technology (NR) may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH and a PUSCH, etc. The one or more gNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE short PUCCH and SR transmission module 126.

The UE short PUCCH module 126 may implement short PUCCH formats and SR transmission for 5th generation (5G) new radio (NR). Uplink control information in NR are described. In LTE, the UCI carries hybrid-ARQ acknowledgements (HARQ-ACK), channel state information (CSI), and a scheduling request (SR). The CSI may include one or more of channel quality indicator (CQI), rank indication (RI), precoding matrix indicator (PMI), precoding type indicator (PTI), etc. Multiple dimensions of CSI may be reported from one or more cells to support FD-MIMO and CoMP operations. The scheduling request (SR) is a special Physical Layer message for the UE 102 to ask the network to send an UL Grant (e.g., Downlink Control Information (DCI) Format 0) so that the UE 102 can transmit PUSCH.

Similarly, in NR, a scheduling request (SR), if defined, needs to be transmitted outside PUSCH, as well as HARQ-ACK for latency reasons. The CSI report in NR should be enhanced to support massive MIMO and beamforming methods. Thus, multiple sets of CSI may be reported in NR. Again, a CSI feedback may include one or more of CQI, RI, PMI, PTI, beam index, etc. At least two types of CSI reports may be supported, periodic CSI and aperiodic CSI. Periodic CSI report can be configured semi-statically. Aperiodic CSI can be trigger with a CSI request from the gNB 160. Therefore, physical uplink control signaling should be able to carry at least hybrid-ARQ acknowledgements, CSI reports (possibly including beamforming information), and scheduling requests.

The UCI information may be transmitted as L1/L2 control signaling (e.g., via a physical uplink control channel (PUCCH) or physical uplink share channel (PUSCH) or uplink data channel). Furthermore, it should be possible to dynamically indicate (at least in combination with Radio Resource Control (RRC)) the timing between data reception and hybrid-ARQ acknowledgement transmission as part of the DCI.

5G NR physical uplink control channel (PUCCH) are also discussed herein. In 5G NR, at least two different types of uplink control channel (PUCCH) formats may be specified, at least one short PUCCH format and one long PUCCH format.

A short PUCCH is also known as a PUCCH in short duration. A long PUCCH is also known as a PUCCH in long duration. A short PUCCH may include one or two symbols. A short PUCCH may provide fast HARQ-ACK response for low latency applications and can reduce the PUCCH overhead. The payload size of a short PUCCH can be lower than a long PUCCH. A long PUCCH format may span multiple symbols and slots. Multiple long PUCCH formats may be defined with at least 4 symbols that are within a slot, or span over multiple slots. A long PUCCH format may be useful for larger payload HARQ-ACK feedback, CSI feedback, etc.

For a short PUCCH, some or all the following parameters may be configured: the number of symbols (i.e., 1 symbol or two symbol); the waveform: CP-OFDM or DFT-S-OFDM; the number of RBs in a PUCCH region/subband; the Reference Signal (RS) location, RS pattern and spreading sequence if applied; the spreading sequence on UCI data symbols if applied; frequency diversity with multiple PUCCH regions/subbands; transmit diversity with two configured PUCCH resources; the location of one or more configured PUCCH regions/subbands including size and position of each PUCCH subband/region in the carrier; and localized or distributed resource allocation for a PUCCH resource in a PUCCH region/subband.

For a long PUCCH, at some or all of the following parameters may be configured for a given UE 102: the waveform: DFT-S-OFDM or CP-OFDM; a long PUCCH may occupy multiple RBs, where the number of RBs of a long PUCCH may be configured (e.g., based on the payload size); the length of a long PUCCH (a long PUCCH may have a minimum length of 4 symbols, and may occupy one or more slots. The length of a long PUCCH can be configurable based on the payload size and delay tolerance, etc.); a tradeoff can be considered between the number of RBs and the number of slots; the RS pattern and RS position; the spreading sequence for UCI multiplexing; frequency diversity with multiple PUCCH regions/subbands; transmit diversity with two configured PUCCH resources; the location of one or more configured PUCCH regions/subbands including size and position of each PUCCH subband/region in the carrier; localized or distributed resource allocation for a PUCCH resource in a PUCCH region/subband.

For a PUCCH format configuration, a combination of semi-static configuration and (at least for some types of UCI information) dynamic signaling may be used to determine the PUCCH formats and resources both for the long and short PUCCH formats.

In NR, multiple short PUCCH formats and multiple long PUCCH formats may be defined, and the PUCCH formats of a UE 102 may be configured by a base station (e.g., gNB 160). To support Time Division Multiplexing (TDM) of short PUCCH from different UEs 102 in the same slot, a mechanism to tell the UE 102 on which symbol(s) in a slot to transmit the short PUCCH is supported at least above 6 GHz. Similarly, for a long PUCCH, the gNB 160 may inform the UE 102 of the starting symbol and the duration of the long PUCCH transmission.

The PUCCH channel may be designed to carry uplink control information (UCI). In NR, multiple short PUCCH formats and multiple long PUCCH formats may be defined, and the PUCCH formats of a UE 102 may be configured by a base station (e.g., gNB 160). For 1-symbol PUCCH with 1 or 2 bits of payload, at least two options may be considered: RS and UCI are multiplexed by FDM manner in the OFDM symbol; and sequence selection with low peak to average power ratio (PAPR).

For a sequence based short PUCCH, a UE 102 can be configured with a set of low PAPR sequences (e.g., Zadoff-Chu sequences). The information carried on the PUCCH is represented by the sequence transmitted. If sequence based short PUCCH is specified, a sequence set including multiple sequences may be assigned for a UE 102 to carry the UCI. For example, 2 sequences in a sequence set for sequence selection may carry 1 bit of UCI; and 4 sequences in a sequence set for sequence selection may carry 2 bits of UCI.

For 1-symbol PUCCH with 1 or 2 bits of payload, if RS and UCI are multiplexed by a frequency division multiplexing (FDM) manner in the OFDM symbol, the RS overhead may be 50%. In other words, 6 RS and 6 UCI carrying resource elements (REs) or subcarriers may be allocated in each resource block (RB).

At least for 1 symbol short-PUCCH with more than 2 bits, RS and UCI may be multiplexed in a FDM manner in the OFDM symbol where RS and UCI are mapped on different subcarriers. Since the UCI payload size for short PUCCH may vary significantly, the RS and UCI multiplexing structure may be different.

Several DMRS ratios can be considered. In an example, 6 DMRS subcarriers in each RB, thus an overhead of 1/2. In another example, 4 DMRS subcarriers in each RB, thus an overhead of 1/3. In another example, 3 DMRS subcarriers in each RB, thus an overhead of 1/4. In yet another example, 3 DMRS subcarriers in each RB, thus an overhead of 1/6.

In one method, a fixed DMRS ratio may be used for a payload higher than 2 bits (e.g., an overhead of 1/3 or 1/4). In another method, the overhead ratio may be configurable for a UE 102. For the UE multiplexing, the gNB 160 should configure UEs 102 with the same RS structure in the same RB.

For a 2-symbol PUCCH, 1-symbol PUCCH structure may be used in each symbol. The same RB resources may be used in 2 symbols. To allow frequency diversity, the 2-symbols may be allocated with different RBs (e.g., in different PUCCH region of a carrier). A 2-symbol NR-PUCCH is composed of two 1-symbol NR-PUCCHs conveying the same UCI. The UCI coding method may depend on the payload size. For UCI payload up to 2 bits, the same UCI may be repeated across the symbols using repetition of a 1-symbol NR-PUCCH. For UCI payload of more than 2 bits, UCI is encoded and the encoded UCI bits are distributed across the symbols.

In another method, a threshold may be defined. For a 2-symbol PUCCH, if the UCI payload is smaller than or equal to the threshold, the UCI may be encoded in a 1-symbol NR PUCCH format, and the same UCI may be repeated across the symbols using repetition of a 1-symbol NR-PUCCH. For a UCI payload of more than the threshold, the UCI may be encoded and the encoded UCI bits are distributed across the symbols. The threshold may be a fixed value (e.g., 2, 4, 8, 10 bits). The threshold may be configured by higher layer signaling. The threshold may be determined based on the number of RBs configured for a 2-symbol PUCCH. For example, if the coding rate, calculated by the UCI payload over the total number of encoded UCI bits in a 1-symbol PUCCH is smaller than a threshold (e.g. 1/3), the same UCI may be repeated across the symbols using repetition of a 1-symbol NR-PUCCH; otherwise, UCI is encoded and the encoded UCI bits are distributed across the symbols. The total number of encoded UCI bits in the 1-symbol PUCCH is calculated by the number allocated RBs, the number of UCI carrying subcarriers in each RB, and 2 bits in each RE with a Quadrature Phase Shift Keying (QPSK) modulation.

Furthermore, for a 2-symbol PUCCH, DFT-S-OFDM may also be used. In this case, the same RB resources may be allocated for 2-symbols. One symbol may be used for DMRS, and another symbol is used to carry coded UCI bits. To allow frequency diversity, multiple RB resources at different regions in a carrier can be allocated for a 2-symbol PUCCH. The DMRS and UCI location may be switched in RBs in different regions.

For a long PUCCH format, the length can be flexible (e.g., in the range of 4 to 14 symbols in a slot), and may include multiple slots.

SR format and resource allocation in NR is also described herein. In LTE, SR has only 1 bit. An SR resource is allocated with PUCCH format 1a/1b. For an SR-only transmission, the SR is indicated by whether the PUCCH on the SR resource is transmitted or not (i.e., one kind of on/off keying (OOK) indication).

If the HARQ-ACK is to be reported on PUCCH format 1a/1b, and if a SR should be reported in the same subframe, the HARQ-ACK bits may be reported on the configured SR resource instead of the HARQ-ACK resource.

In NR, a similar concept may be applied. For example, if there is no SR to be reported, no signal is transmitted on the scheduled SR resource. However, the detailed SR format and resource allocation are not discussed yet.

In NR, SR may be 1 bit, or more than 1 bit. If there is more than 1 bit, extra information can be carried by the SR signal (e.g., the priority of the UL data request for scheduling). This is very useful if there are multiple applications with different QoS requirements. For example, an eMBB service that requires high throughput but is not very delay sensitive, or a URLLC service that requires fast transmission and ultra-reliability.

Depending on the number of bit for SR, multiple options may be supported. In a first option (Option 1), the SR configuration and resources can be configured via dedicated RRC signaling separately for different applications or traffic types. Thus, multiple SR configurations and resources may be configured for a UE 102 (e.g., one SR configuration and resource for eMBB, and another SR configuration and resource for URLLC).

In this case, there is no need to support multiple bits in a SR. A single bit SR may be used. The SR resources for different priorities can have different formats and resource overheads. Both long PUCCH and short PUCCH may be configured for the eMBB SR resource. Only a short PUCCH format should be used for URLLC SR resource to support low latency. The PUCCH formats and numerologies for different applications can be the same as or different (e.g., SR resource for URLLC traffic may use a higher subcarrier spacing (SCS) than the SR resource for eMBB.

The UE 102 may transmit the SR for different traffics on the configured SR resources. In case of a collision between SR for different traffics, the SR for the traffic with higher priority should be transmitted (e.g., a SR of URLLC should have higher priority than a SR for eMBB).

In a second option (Option 2), only one SR configuration and resource is configured regardless of traffic type. In this case, the SR may be only 1 bit for a UE 102 that supports only eMBB. The SR may have multiple bits to indicate the priority of the pending traffic for a UE 102 that supports both eMBB and URLLC. To satisfy URLLC requirements, the multi-bit SR resource may be allocated with short periodicity at mini-slot level.

Therefore, the gNB 160 may configure the SR resource for a UE 102. The gNB 160 may signal the number of bits for a SR in the configuration.

For a SR resource, different PUCCH formats may be supported. In one case, the SR resource may be configured with a PUCCH format in short duration. This may potentially provide a fast response for a scheduling request.

The SR resource may be configured in different RBs from regular PUCCH resources for a given UE 102. The regular PUCCH format may be different from the PUCCH format for SR resource.

The SR resource may be configured to share the same RBs with regular short PUCCH resources for a given UE 102. In this case, the SR resource and regular PUCCH resource should have the same structure (e.g., RS location).

A SR resource may be configured with 1-symbol PUCCH format. The SR resource may be on based on sequence selection, or based on RS and UCI multiplexing in a FDM manner. Whether a SR signal is transmitted or not on a SR resource indicates on/off keying (OOK) of SR.

In a case of a sequence-based SR configuration, the set of sequences assigned to a UE 102 may be determined based on the number of bits in a SR transmission. If there is only 1 bit in a SR, the on/off of SR transmission can indicate that. Thus, only one sequence is needed for a UE 102. If a set of two sequences are configured for a SR resource, besides on/off keying (OOK) of SR transmission, 1 bit of extra information can be carried by SR (e.g., to indicate the priority of a pending data (for URLLC or eMBB, for instance)). If a set of four sequences are configured for a SR resource, besides on/off keying (OOK) of SR transmission, 2 bits of extra information can be carried by SR (e.g., to indicate the priority of a pending data (for URLLC or eMBB, for instance)).

In this case, the SR resource may use different RBs than other PUCCH resources. The SR resource may share the same RBs with other PUCCH resources for the same UE 102 or different UEs 102. In a case when the same RB is shared by SR resources and PUCCH resources of the same UE 102, different sets of sequences may be configured for RS and other UCI (e.g., HARQ-ACK).

In a case of RS and UCI multiplexing, since SR only carries one or two bits of payload, it is better to use a short PUCCH structure with 50% DMRS overhead (e.g., 6 RS and 6 UCI REs in each RB). If the UCI symbols of a SR transmission are modulated by Binary Phase Shift Keying (BPSK), besides on/off keying (OOK) of SR transmission, 1 bit of extra information can be carried by SR (e.g., to indicate the priority of a pending data (for URLLC or eMBB, for instance)). If UCI symbols of a SR transmission is modulated by QPSK, besides on/off keying (OOK) of SR transmission, 2 bits of extra information can be carried by SR (e.g., to indicate the priority of a pending data (for URLLC or eMBB, for instance)).

In this case, the SR resource may use different RBs than other PUCCH resources. The SR resource may share the same RBs with other PUCCH resources for the same UE 102 or different UEs 102. In this case, the DMRS structure should be the same for the SR and other PUCCH formats. In a case when the same RB is shared by SR resources and PUCCH resources of the same UE 102, different orthogonal cover codes or sequences may be configured on the RS and UCI carrying REs.

For robustness, the SR resource can be configured with 2-symbol PUCCH in short duration. If so, 1-symbol SR resource structure should be reused in each symbol, and frequency hopping should be applied to provide frequency diversity for SR transmission. The same SR information may be repeated across the symbols using repetition of a 1-symbol NR-PUCCH.

Due to coverage issues, a PUCCH in short duration may not satisfy the required performance criteria. Thus, PUCCH in long duration may be used for UCI feedback, including SR. Thus, SR resources may also be configured with a long PUCCH format. If there is no SR to be reported, no signal is transmitted on the configured SR resource.

For a SR resource, a long PUCCH format with a payload of 1 or 2 bits should be used. Furthermore, for a given UE 102, the duration of a long PUCCH configured for the SR should be shorter or the same as a long PUCCH configured for other UCI. If the UCI symbols of a SR transmission are modulated by BPSK, besides on/off keying (OOK) of SR transmission, 1 bit of extra information can be carried by SR (e.g., to indicate the priority of a pending data (for URLLC or eMBB, for instance)). Similarly, if UCI symbols of a SR transmission is modulated by QPSK, besides on/off keying (OOK) of SR transmission, 2 bits of extra information can be carried by SR (e.g., to indicate the priority of a pending data (for URLLC or eMBB, for instance)).

Collision between SR and other UCI feedback on PUCCH is also described herein. If a fixed/unified length of subframe/slot is used for UCI and SR transmissions and, if HARQ-ACK and SR need to be reported in the same subframe/slot, several methods can be defined to simultaneously report both on a PUCCH. For example in LTE, if PUCCH format 1a/1b is used for HARQ-ACK feedback, the HARQ-ACK is reported in the SR PUCCH resource instead of the HARQ-ACK PUCCH resource. If PUCCH format 3/4/5 is used HARQ-ACK feedback, the SR bit is appended to the HARQ-ACK bits, and reported in HARQ-ACK PUCCH resource.

In addition, similar issues of simultaneous SR and HARQ-ACK reporting issue are discussed hereafter. In NR, the PUCCH duration may be different for different UCI feedback. Thus, the length of a SR resource may be different from a PUCCH resource for other UCI (e.g., HARQ-ACK). Thus, the SR may be fully overlap or partially overlap with a PUCCH for other UCI, such as HARQ-ACK.

In a full overlap case, the PUCCH for HARQ-ACK has the same length of the PUCCH resource for SR, and the SR and HARQ-ACK needs to be reported in the same symbols. In one method, a joint report may be applied as mentioned above, if the PUCCH for HARQ-ACK supports more than 2 bits, and 1 or 2 bits of SR may be appended to HARQ-ACK bits and still satisfies the PUCCH payload limit, the HARQ-ACK and SR bits may be jointed coded and transmitted on the PUCCH resource for HARQ-ACK. No signal is transmitted on the SR resource.

However, in some cases, if the HARQ-ACK is reported on a PUCCH that supports up to 2 bits, and if multiple bit SR is configured, joint HARQ-ACK and SR reporting on one PUCCH resource may not be possible due to the limited payload size for a short PUCCH in NR. Assuming both HARQ-ACK and SR are configured with short PUCCH, several detailed cases are discussed below as examples.

A first case (Case 1) includes 1 or 2 bits of HARQ-ACK, and 1 bit of SR. For a sequence based PUCCH, since the set of sequences for each feedback bit are pre-defined or configured, there is no way to transmit both information on one PUCCH since there is no sequence space for extra information. For RS and UCI multiplexing based PUCCH, the HARQ-ACK can be reported as the UCI payload on the SR resource, similar to PUCCH format 1a/1b case in LTE.

A second case (Case 2) includes 1 or 2 bits of HARQ-ACK, and multiple bits of SR payload. For a sequence based PUCCH, if multiple SR bits are used in NR, multiple sequences should be allocated for SR. No extra sequence can be used to combine the HARQ-ACK and SR on either the PUCCH resource for HARQ-ACK or the PUCCH resource for SR. Similarly, for RS and UCI multiplexing based PUCCH, there is no extra modulation or code space to carry extra bit of information on either the PUCCH resource for HARQ-ACK or the PUCCH resource for SR.

In one method, to accommodate all HARQ-ACK and SR bits, a PUCCH format adaptation may be applied. A UE 102 may be configured with multiple PUCCH resources with different maximum payload sizes. In a case of simultaneous HARQ-ACK and SR transmissions, a PUCCH resource with higher payload may be used instead of the default PUCCH resource with 1 or 2 bits payload.

A PUCCH resource with a higher payload may be configured for HARQ-ACK. The configuration may be by higher layer signaling. The configuration may be by dynamic physical layer signaling. Thus, the SR may be appended to the HARQ-ACK bits, then jointly coded and reported on the PUCCH resource with higher payload for HARQ-ACK. No signal is transmitted on the configured SR resource.

A PUCCH resource with higher payload may be configured for SR. The configuration may be by higher layer signaling. The configuration may be by dynamic physical layer signaling. Thus, the SR may be appended to the HARQ-ACK bits, then jointly coded and reported on the PUCCH resource with higher payload for SR. No signal is transmitted on the configured HARQ-ACK resource.

In both cases, since the PUCCH adaptation only occurs occasionally, the adaptive PUCCH resource with higher payload may be shared by multiple UEs 102, or may be UE specific.

Alternatively, the existing PUCCH format and resource for 1 or 2 bits may be adapted to a PUCCH format with higher payload at the same RB resources. For example, in a case of short PUCCH with sequence selection, a set of sequences should be reserved to carry extra bits for simultaneous HARQ-ACK and SR transmission. However, reserving sequences for extra bits reduces the UE multiplexing capability of the PUCCH resources. In a case of short PUCCH with RS and UCI multiplexing, the DMRS pattern may be adapted from 6 RS and 6 UCI carrying REs in a RB to 4 RS and 8 UCI carrying REs in a RB. This allows extra UCI bits to be carried on the PUCCH resource. On the other hand, the PUCCH adaption may cause interference to PUCCH of other UEs 102 multiplexed on the same RB resources.

The PUCCH format adaptation may be applicable to HARQ-ACK PUCCH. Thus, the SR may be appended to the HARQ-ACK bits, then jointly coded and reported on the adapted PUCCH format and resource for HARQ-ACK. And, no signal is transmitted on the configured SR resource.

The PUCCH format adaptation may be applicable to SR PUCCH. Thus, the SR may be appended to the HARQ-ACK bits, then jointly coded and reported on the adapted PUCCH format and resource for SR transmission. And no signal is transmitted on the configured HARQ-ACK resource.

In LTE, all PUCCH has the same duration in time. But in NR, the PUCCH durations can be same or very different for different reporting. Thus, in partial overlap cases, the scenarios are more complicated because the different PUCCH has different reporting timing associations. In general, it is not possible to joint encode another UCI into an ongoing UCI transmission.

For SR with low priority, it may be assumed that the SR bit is known before a simultaneous PUCCH transmission carrying other UCI occurs. Thus, the SR may be jointly coded with other UCI and transmitted on the PUCCH resource for the other UCI. Or, the SR transmission may be postponed to a later SR instance.

For SR with high priority, a postponed transmission may not be acceptable to satisfy the latency requirements. Also, the SR may not be available when a simultaneous PUCCH transmission carrying other UCI starts.

Thus, new methods have to be specified in NR for handling collisions between SR and other UCI (e.g., HARQ-ACK). To allow SR transmission together with PUCCH for other UCI, NR may support simultaneous PUCCH transmission on a single reporting cell. For example, one PUCCH is for SR transmission, another PUCCH is for other UCI transmission. The multiple PUCCH reporting in one cell can be a UE capability. Thus, a UE 102 may inform the gNB 160 of its capability of supporting simultaneous PUCCH reporting in a cell.

Furthermore, the concept can be extended to other UCI transmissions (e.g., one PUCCH for HARQ-ACK and another PUCCH for CSI feedback). To simplify the specification, the number of simultaneous PUCCH transmissions on a PUCCH reporting cell (e.g., a PCell or pSCell) may be limited to two. The feature of multiple PUCCH transmission on a PUCCH reporting cell may be a UE capability. Multiple PUCCH transmission on a PUCCH reporting cell may be configured by higher layer signaling (e.g., RRC for a UE 102).

If multiple PUCCH transmission on a PUCCH reporting cell is supported or configured for a UE 102, the UE 102 may simultaneously transmit multiple PUCCHs with different UCI (e.g., one PUCCH transmission for SR on SR resource, and another PUCCH for HARQ-ACK on HARQ-ACK PUCCH resources).

In a power-limited case, power scaling can be applied on the channels based on priority rules. The priority rule may be based on UCI type and the corresponding traffic priorities. For example, the URLLC traffic should have higher priority than eMBB traffic. The following order may be applied from the highest priority to lowest priority: HARQ-ACK for high priority traffic (e.g., URLLC); SR with high priority (e.g., URLLC); HARQ-ACK for other traffic (e.g., eMBB); SR with low priority (e.g., eMBB); CSI for high priority channel (e.g., URLLC); CSI for low priority channel (e.g., eMBB); and Uplink data (i.e., PUSCH).

In case of multiple SR bits, the higher priority and lower priority may be classified by the SR value. For example, if one extra bit is carried by SR, a SR value of 1 may indicate a higher priority; a SR value of 0 may indicate a lower priority. If two extra bits are carried by SR, in one case, a SR value of "11" in binary can indicate a high priority. Other values are classified as low priority. In another case, a SR value of "11" or "10" in binary can indicate a high priority. Other values are classified as low priority. The threshold to classify traffic priority in SR can be fixed in specification or can be configured by the gNB 160 with higher layer signaling.

In a power-limited case, the UE 102 should allocate the power to the control channel with highest priority first, then allocate the remaining power to other uplink control channel or data channel. This principle is applicable to all PUCCH collisions between SR and HARQ-ACK, between HARQ-ACK and/or SR and CSI.

If multiple PUCCH transmission on a PUCCH reporting cell is not supported or not configured for a UE 102, the UE 102 may only transmit one PUCCH on a PUCCH reporting cell.

If the PUCCH for HARQ-ACK supports more than 2 bits, and the UE 102 can append the SR bits to HARQ-ACK in the same PUCCH resource, the HARQ-ACK and SR may be jointly reported on the HARQ-ACK PUCCH resource. Otherwise, the same priority rule above may be applied to determine which control information is transmitted and which channel is dropped. For example, if SR with high priority traffic request (e.g., URLLC) collides with a HARQ- ACK feedback for low priority traffic (e.g., eMBB), the SR with high priority traffic request should be transmitted, and the HARQ-ACK feedback for low priority traffic may be dropped. If SR with low priority traffic request (e.g., eMBB) collides with a HARQ-ACK feedback for low priority traffic (e.g., eMBB), the SR with low priority traffic request should be dropped, and the HARQ-ACK feedback for low priority traffic may be transmitted.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB short PUCCH and SR transmission module 194. The gNB short PUCCH module 194 may implement short PUCCH formats and SR transmission for 5G NR as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
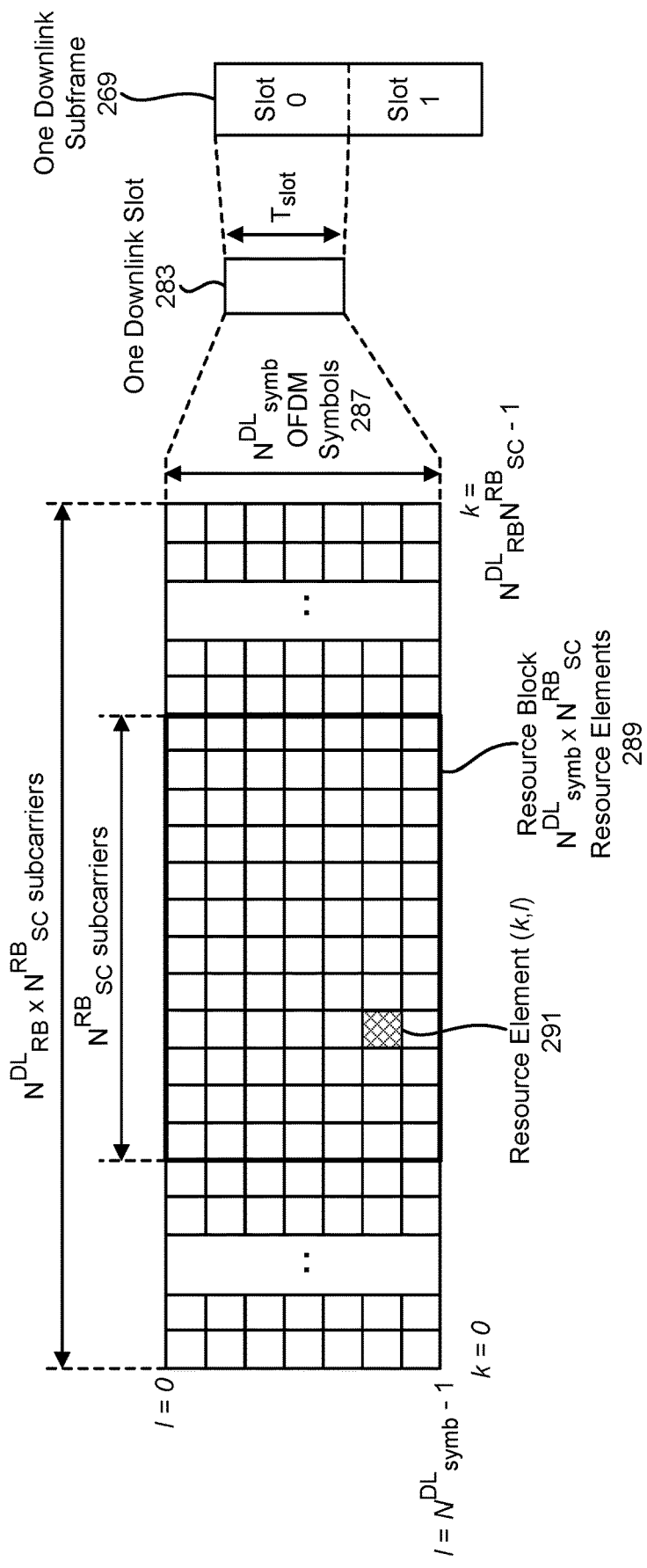
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}RB$ is broadcast as a part of system information. For an SCell (including an licensed assisted access (LAA) SCell), $N^{DL}_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
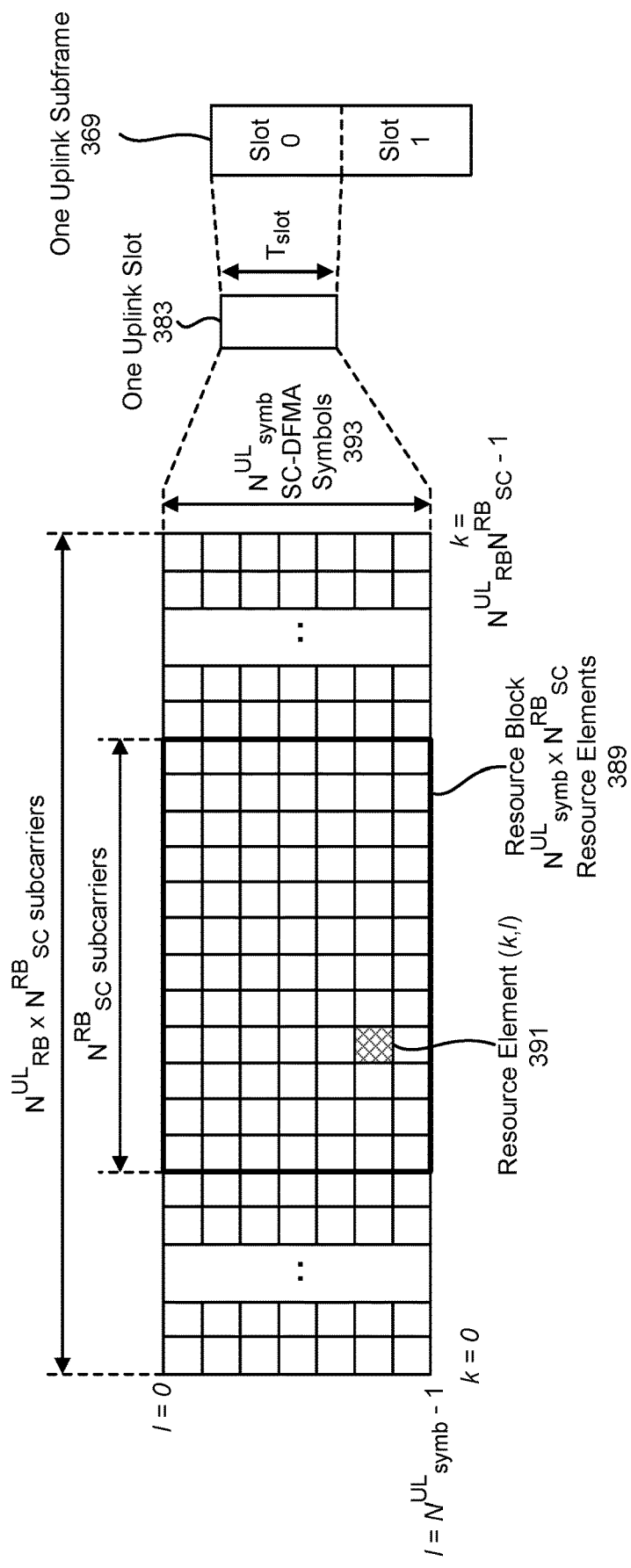
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
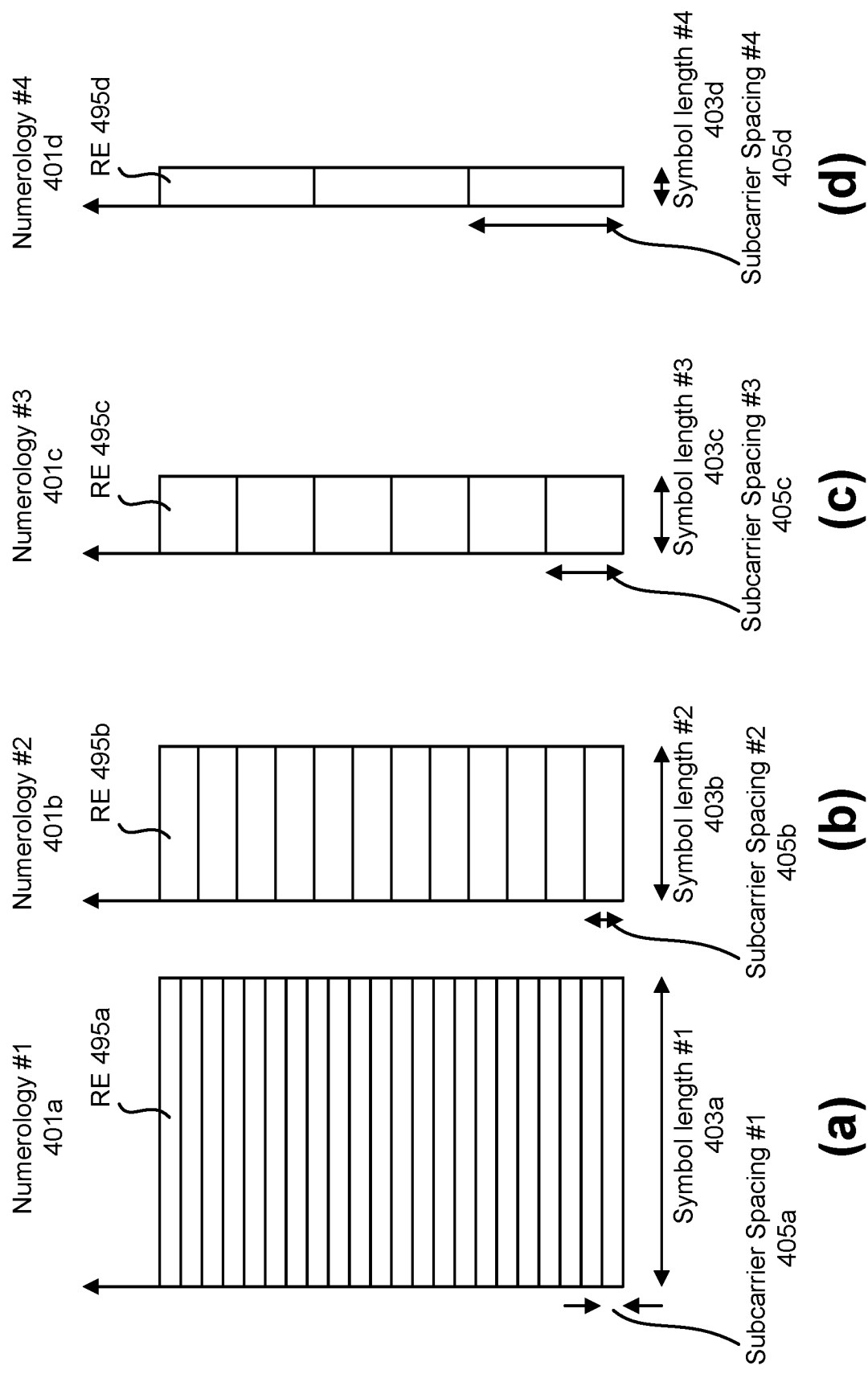
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15 * 2^i$ and the effective OFDM symbol length $2048 * 2^{-i} * Ts$. It may cause the symbol length is $2048 * 2^{-i} * Ts + CP$ length (e.g., $160 * 2^{-i} * Ts$ or $144 * 2^{-i} * Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

Figure 5:
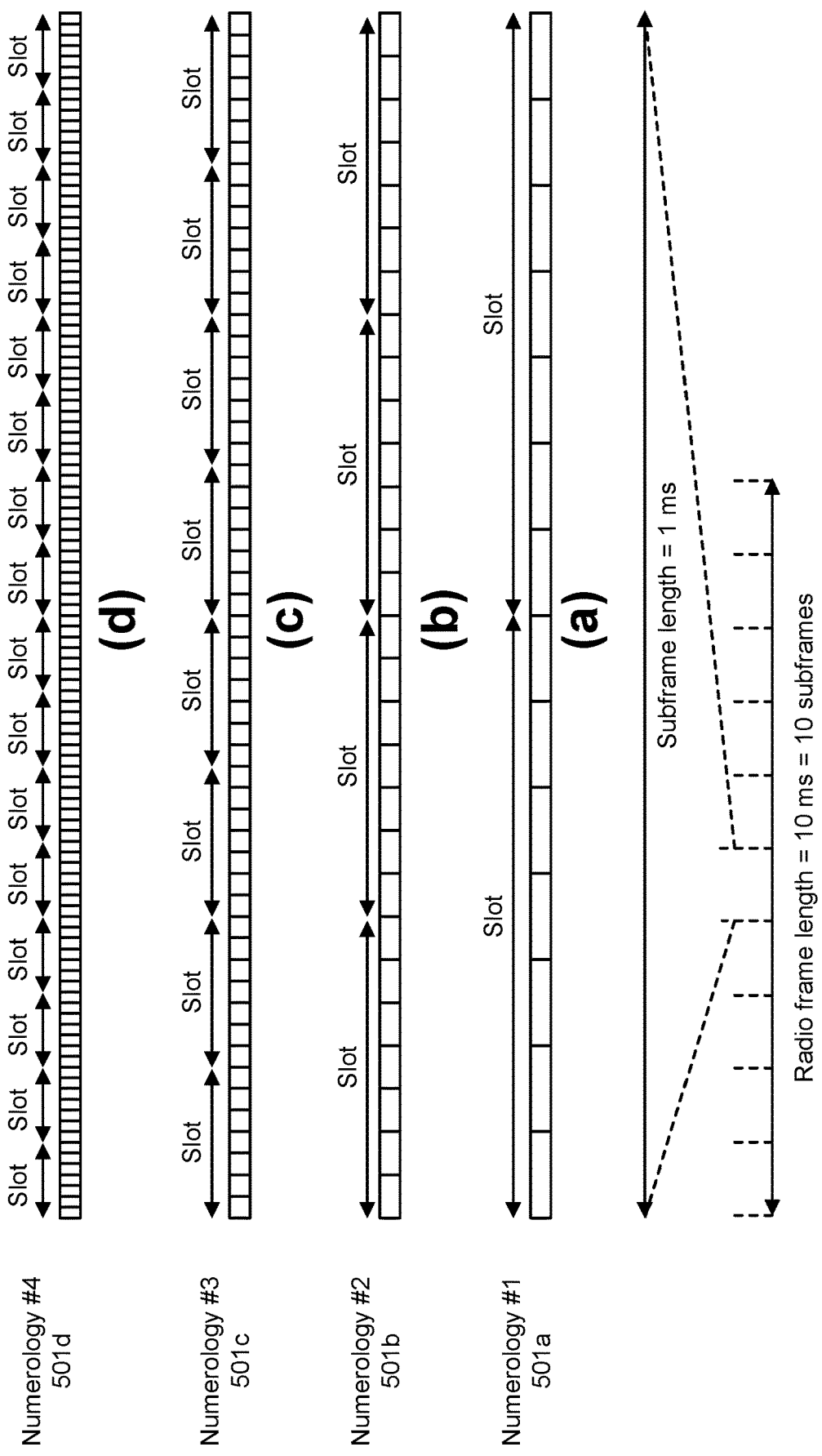
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
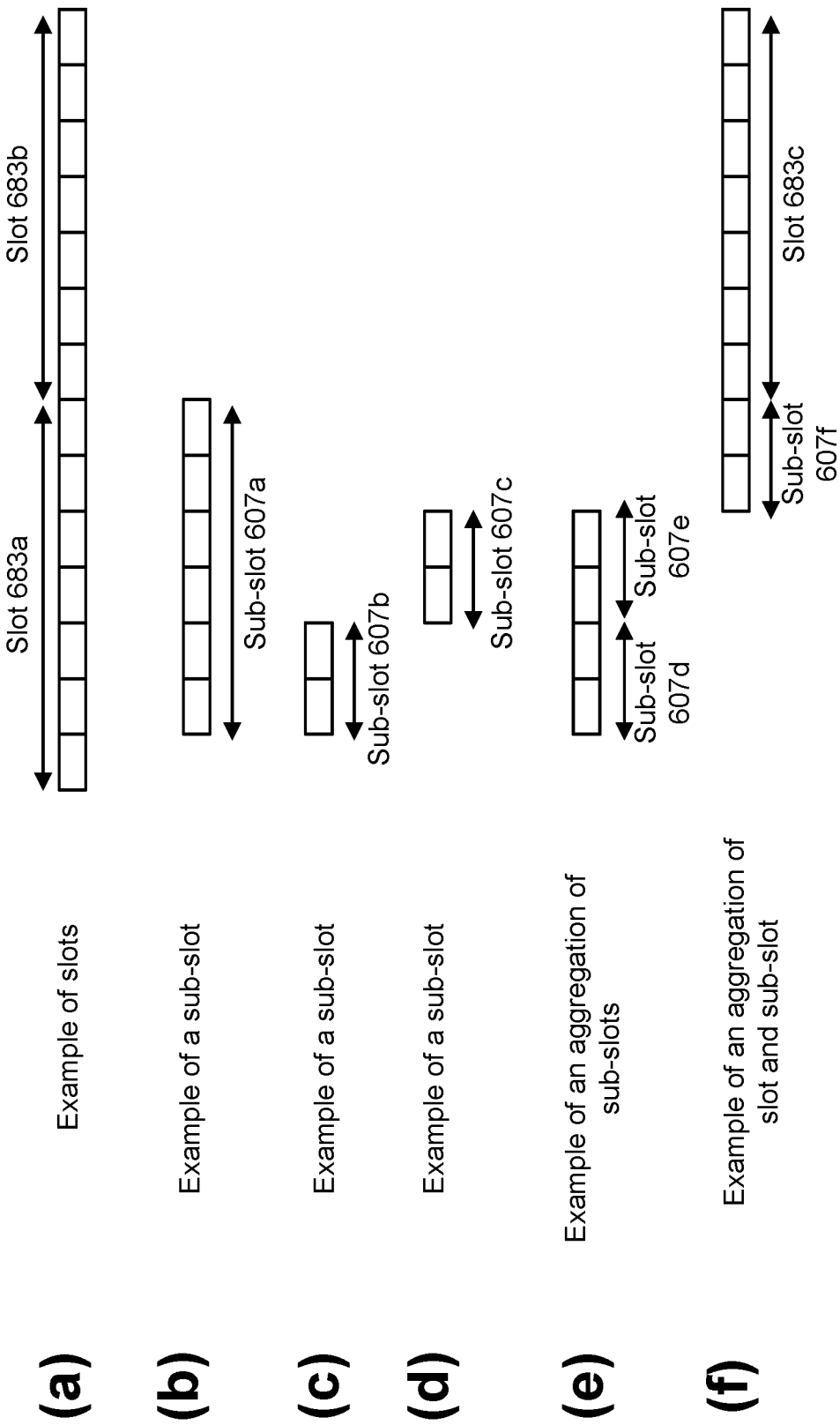
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, Physical Resource Block (PRB) index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
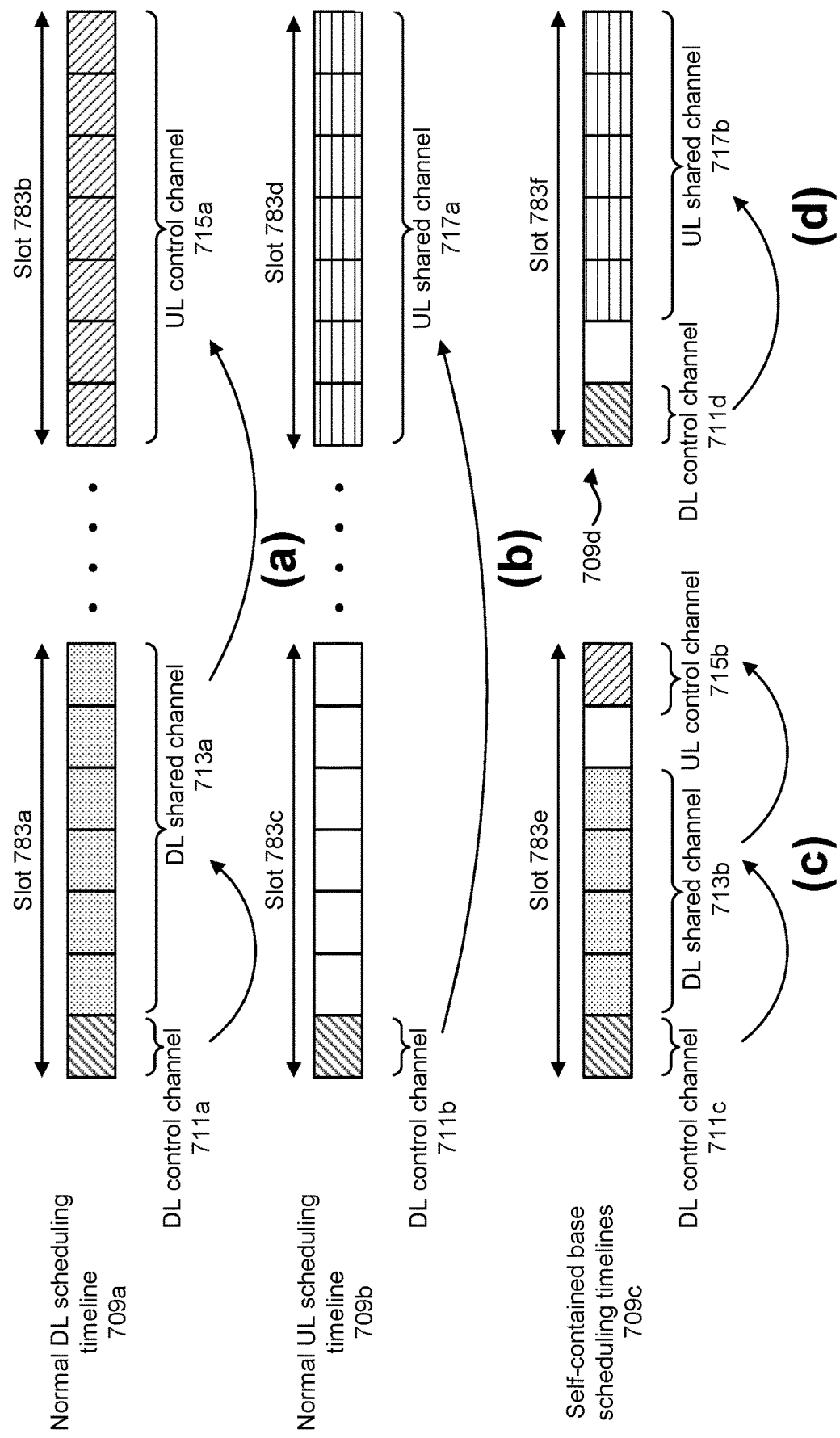
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
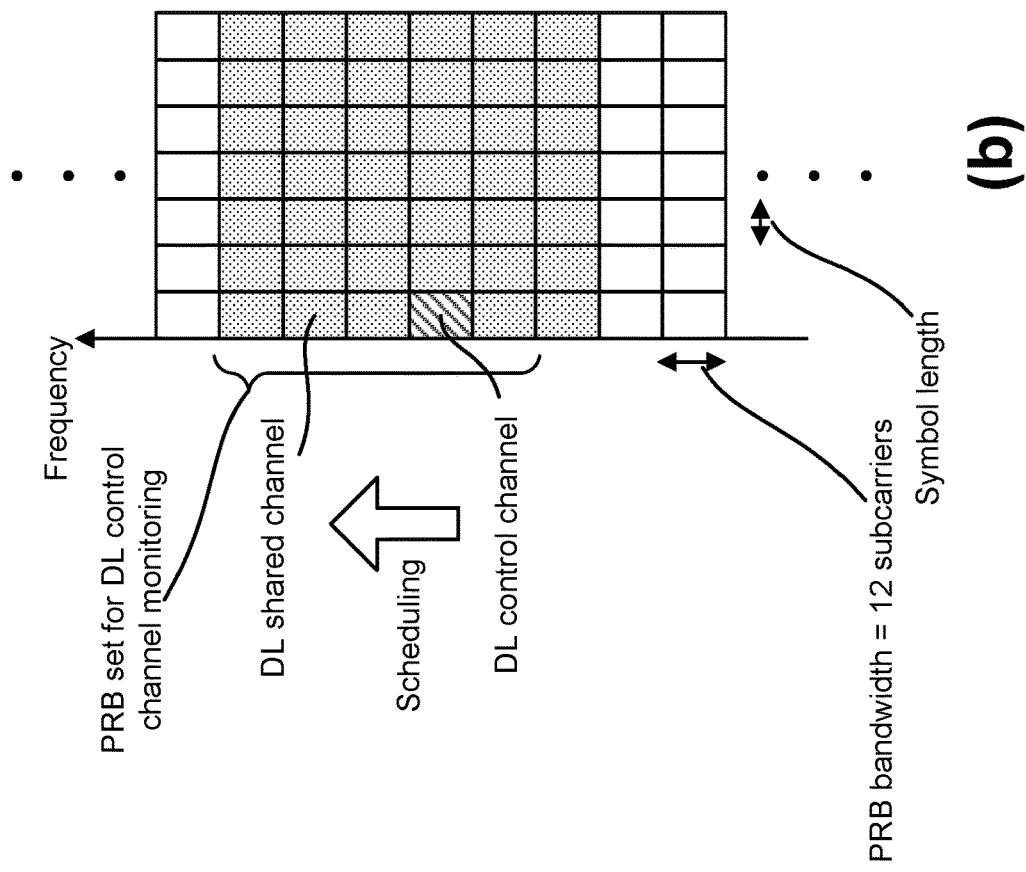
FIG. 8 shows examples of downlink (DL) control channel monitoring regions.
Figure 8:
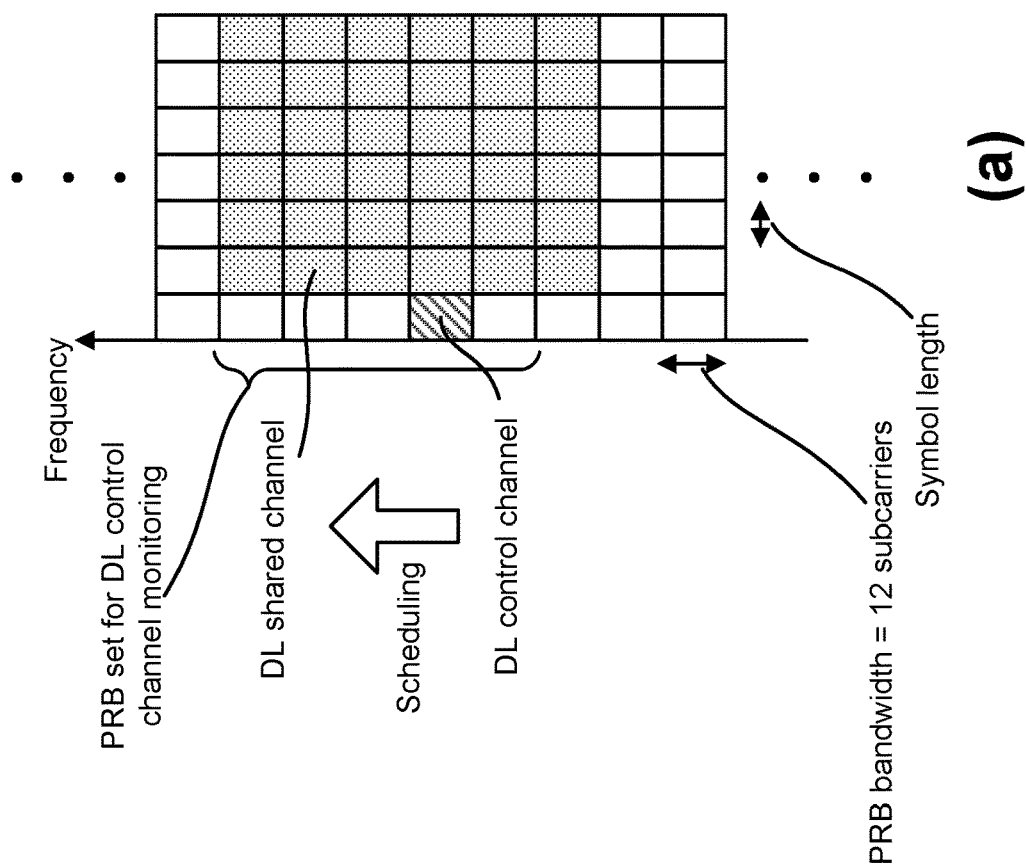

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DMRS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
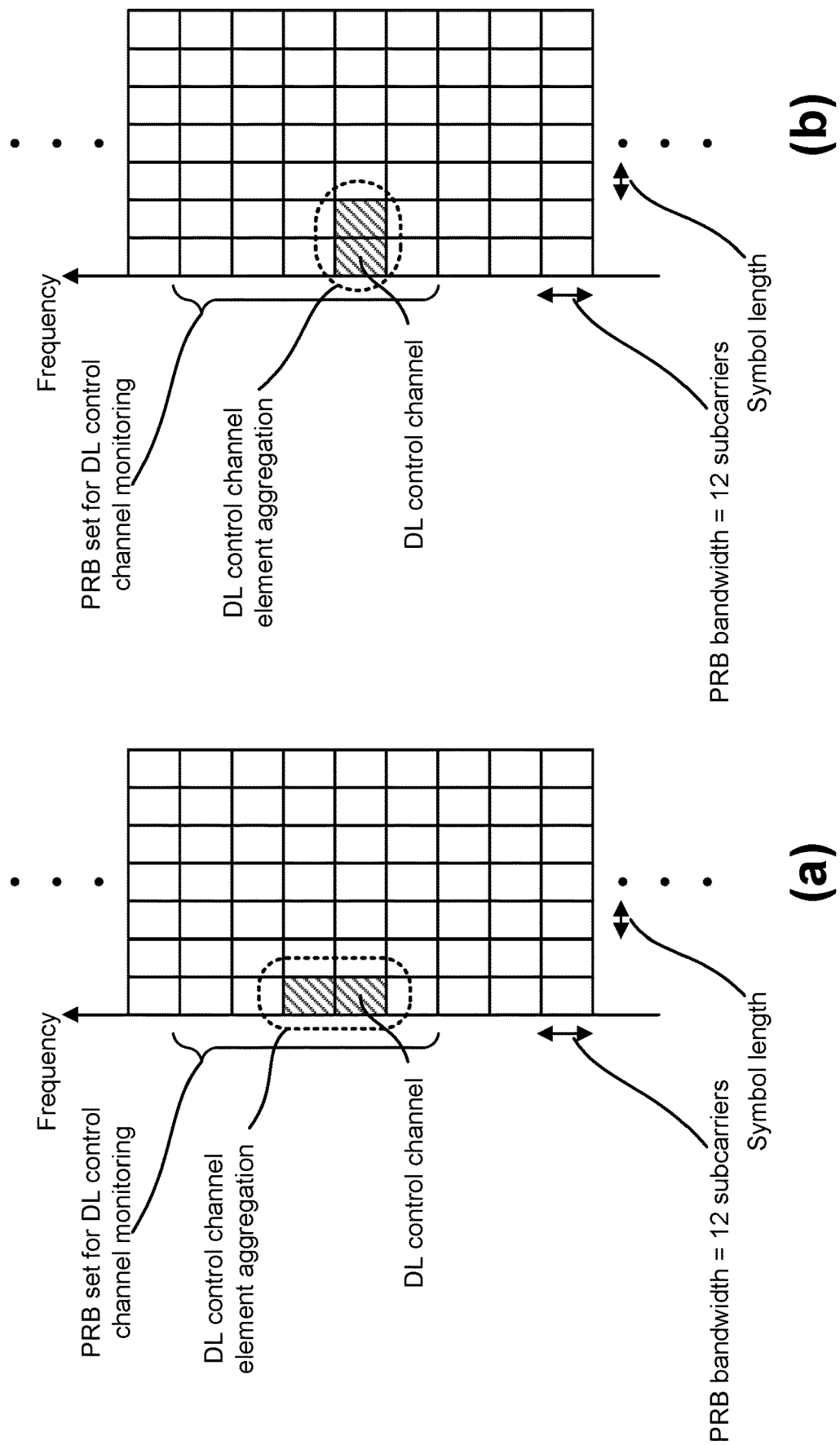
FIG. 9 shows examples of DL control channel which consists of more than one control channel elements.

FIG. 9 shows examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
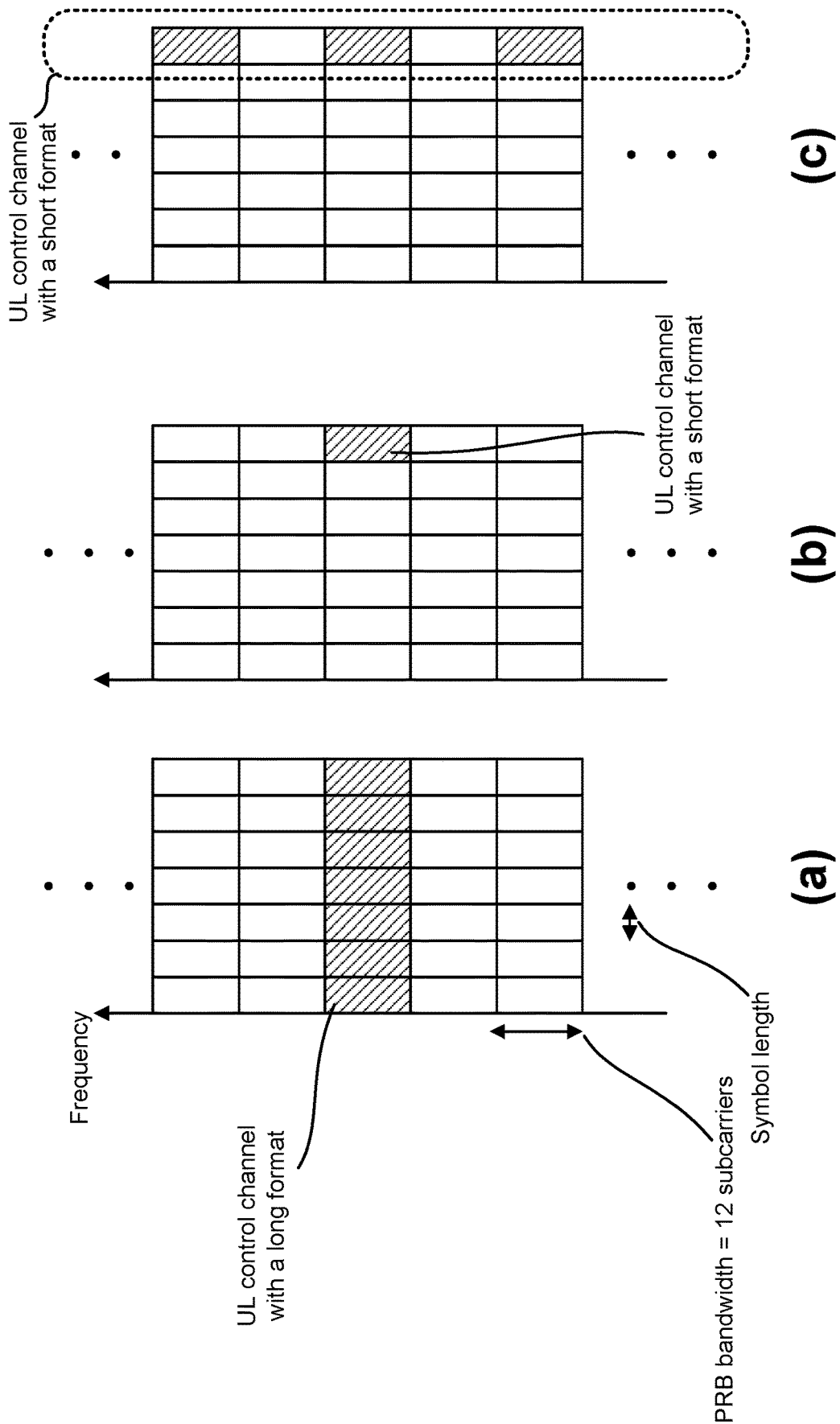
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 11:
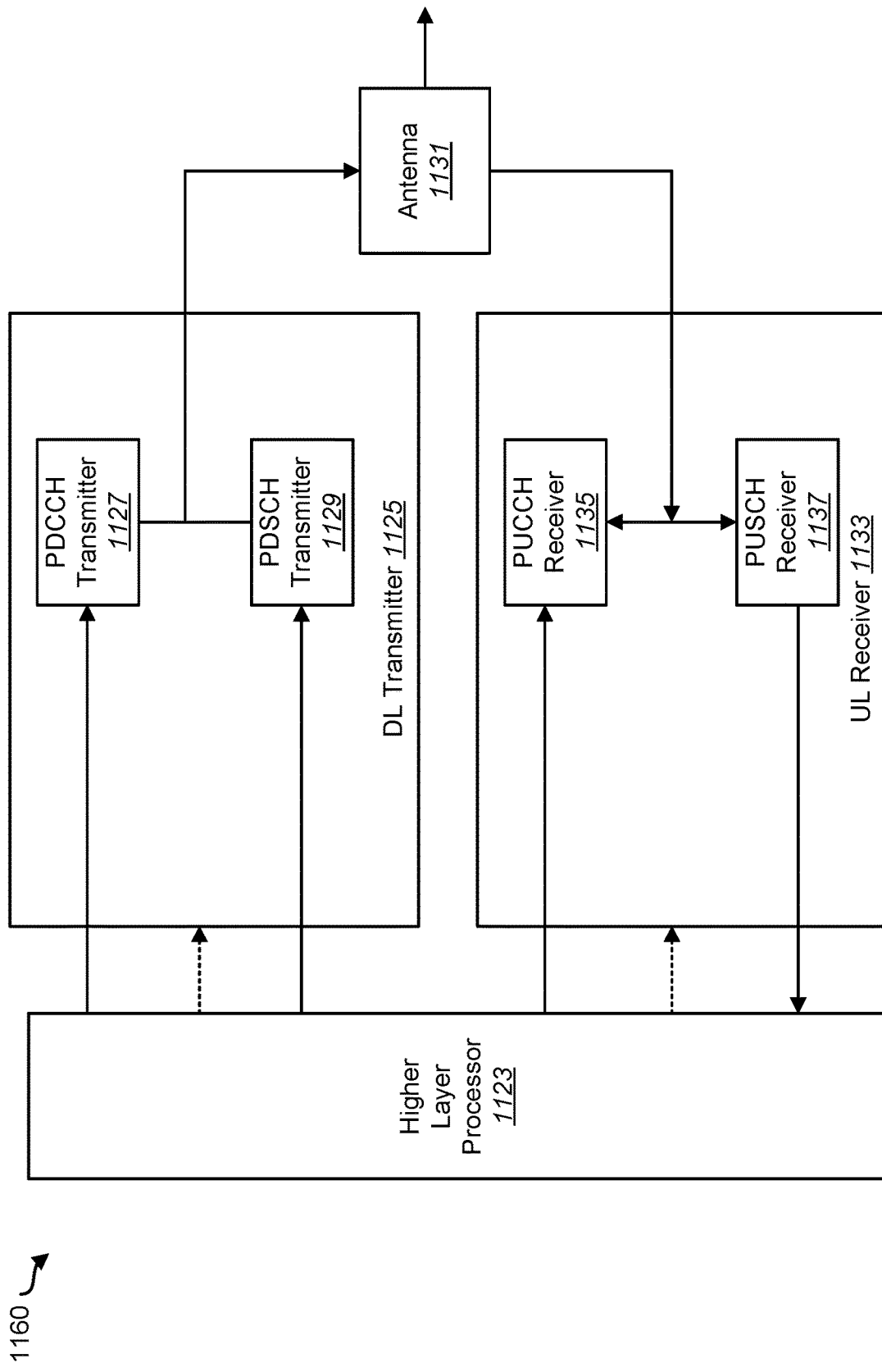
FIG. 11 is a block diagram illustrating one implementation of a gNB.

FIG. 11 is a block diagram illustrating one implementation of an gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
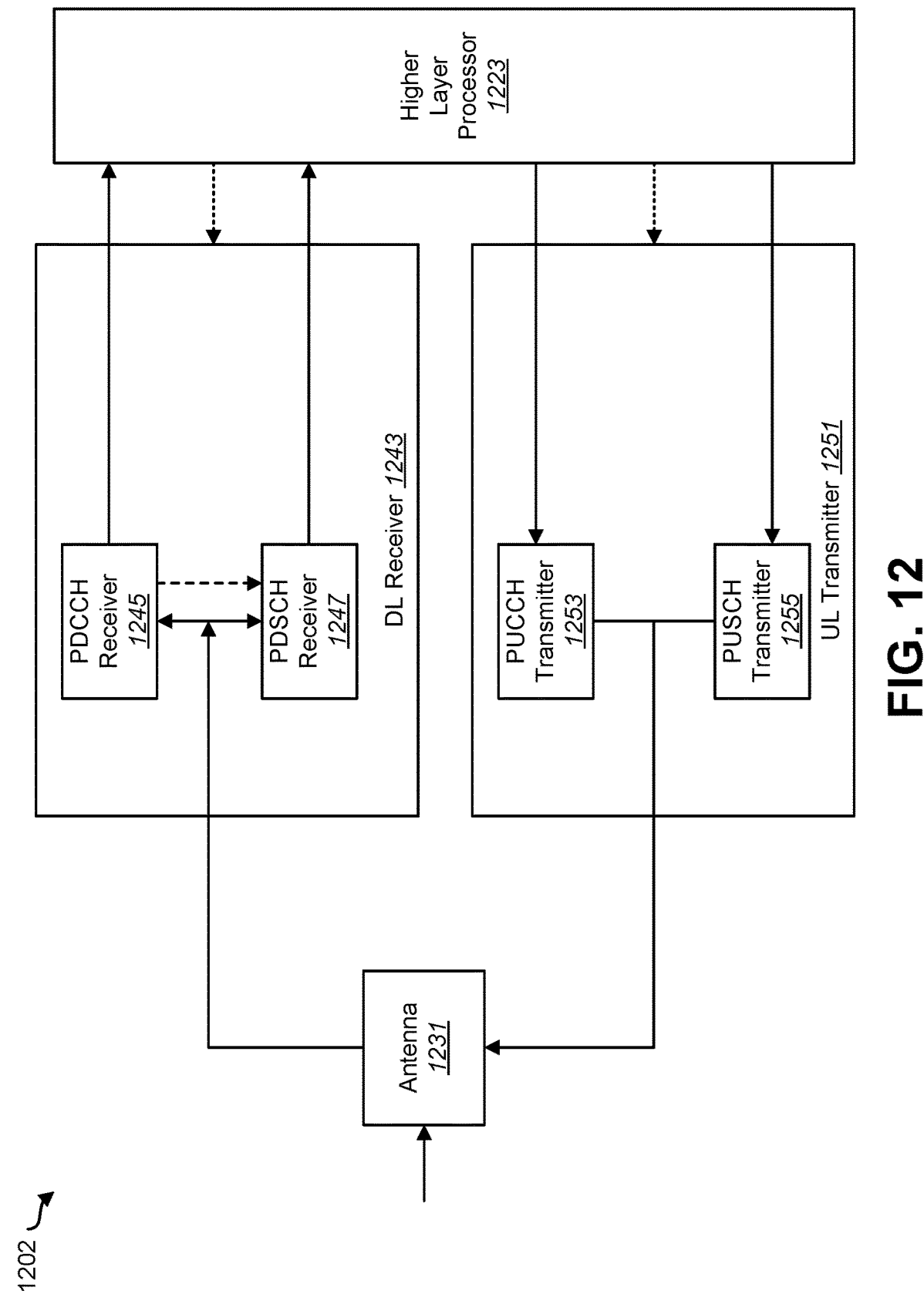
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
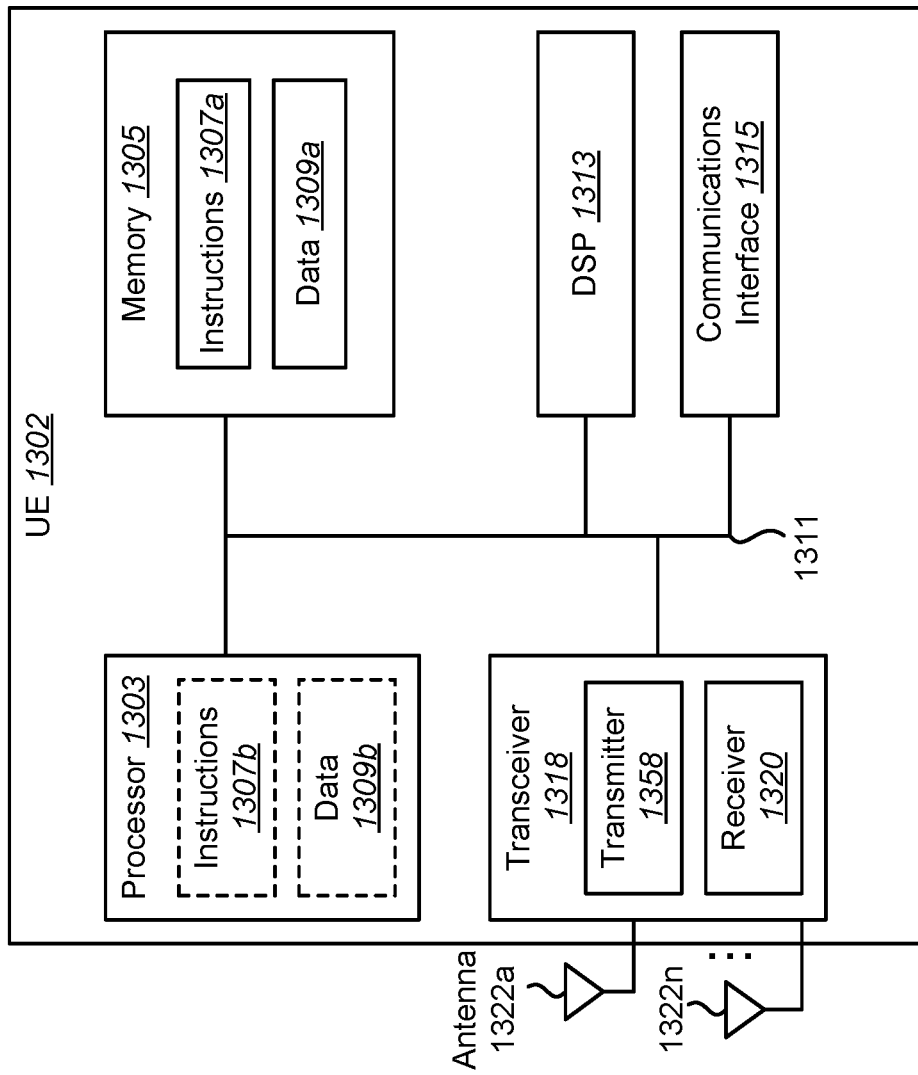
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
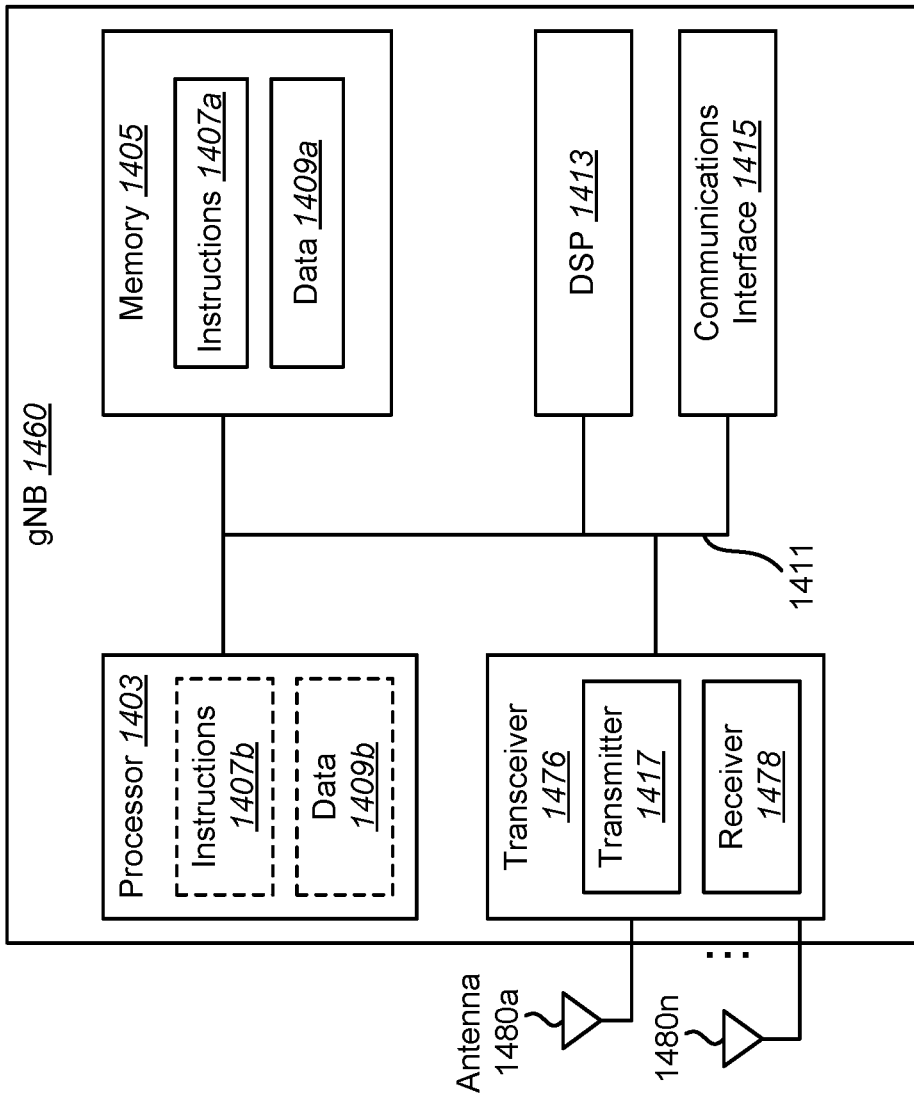
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
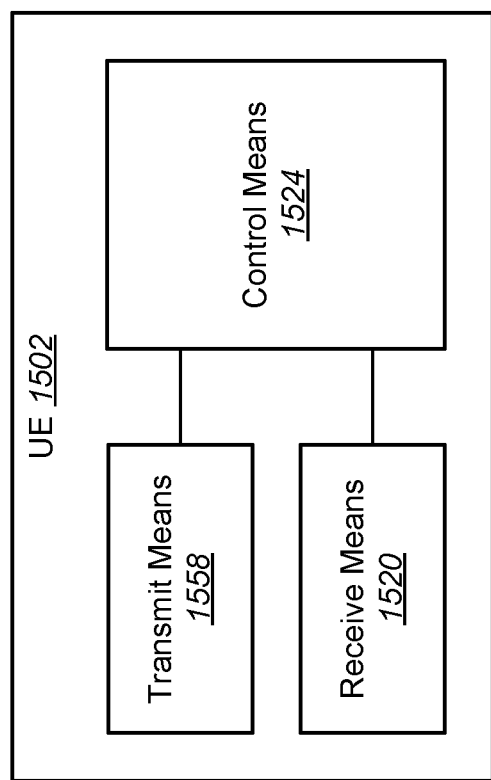
FIG. 15 is a block diagram illustrating one implementation of a UE in which short PUCCH formats and SR transmission for 5G NR may be implemented.

FIG. 15 is a block diagram illustrating one implementation of a UE 1502 in which short PUCCH formats and SR transmission for 5G NR may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
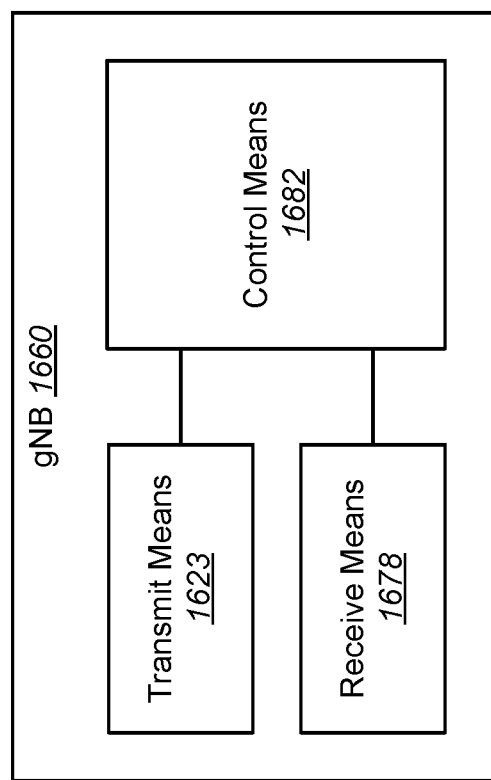
FIG. 16 is a block diagram illustrating one implementation of a gNB in which short PUCCH formats and SR transmission for 5G NR may be implemented.

FIG. 16 is a block diagram illustrating one implementation of a gNB 1660 in which short PUCCH formats and SR transmission for 5G NR may be implemented. The gNB 1660 includes transmit means 1617, receive means 1678 and control means 1682. The transmit means 1617, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
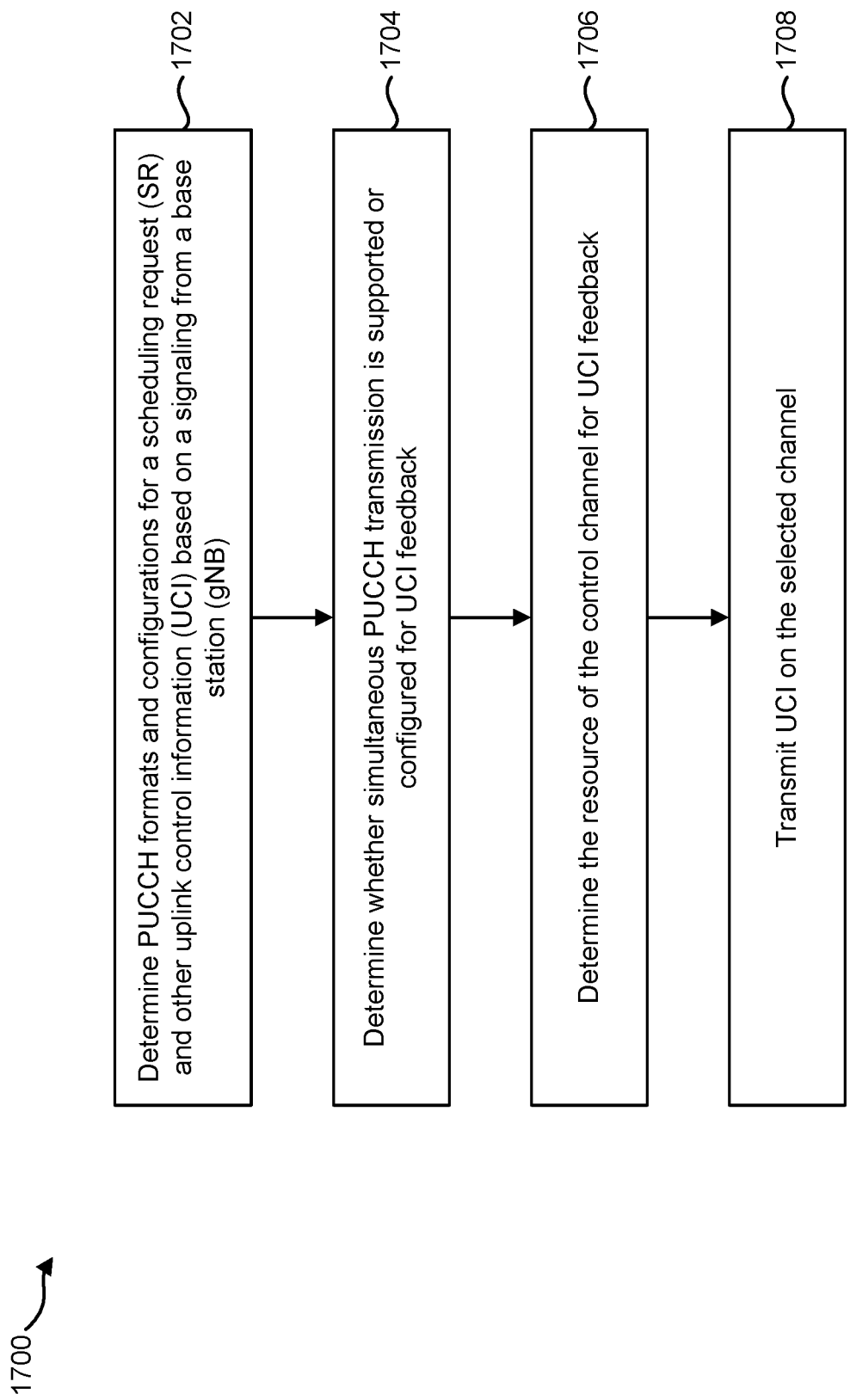
FIG. 17 is a flow diagram illustrating a method for implementing short PUCCH formats and SR transmission for 5G NR.

FIG. 17 is a flow diagram illustrating a method 1700 for implementing short PUCCH formats and SR transmission for 5G NR. The method 1700 may be implemented by a UE 102. The UE 102 may determine 1702 uplink control channel (PUCCH) formats and configurations for a scheduling request (SR) and other uplink control information (UCI) based on a signaling from a base station (gNB) 160. For example, the PUCCH format and configuration may include at least a short PUCCH format and a long PUCCH format. The short PUCCH format and long PUCCH format may have the same or different waveforms and/or numerologies.

In an implementation, the resource for a SR transmission may be based on a PUCCH in short duration with one or two symbols. A set of sequences may be configured on a SR resource to carry multiple SR bits. A demodulation reference signal (DMRS) pattern with 6 RS and 6 UCI carrying resource elements may be used for the SR resource. In a 2-symbol SR resource, one symbol SR format may be repeated with the same information in two symbols with frequency diversity.

In another implementation, the resource for a SR transmission is configured on a PUCCH in long duration.

The UE 102 may determine 1704 whether simultaneous PUCCH transmission is supported or configured for UCI feedback. If simultaneous PUCCH transmission is supported, the UE 102 may simultaneously transmit multiple PUCCHs with different UCI (e.g., one PUCCH transmission for SR on the SR resource, and another PUCCH for HARQ-ACK on HARQ-ACK PUCCH resources).

The UE 102 may determine 1706 the resource of the control channel for UCI feedback. If the UE 102 is power limited, the UE 102 may perform power scaling on simultaneous uplink control channels based on a priority rule. A priority order from highest to lowest may be as follows: HARQ-ACK for higher priority traffic, SR for higher priority traffic, HARQ-ACK for lower priority traffic, SR for lower priority traffic, CSI for higher priority traffic, and CSI for lower priority traffic. If the UE 102 is power limited, the UE 102 may allocate power to a control channel with highest priority first, then allocates remaining power to another uplink control channel or data channel.

If simultaneous PUCCH transmission is not supported or not configured for uplink control information (UCI) feedback, the UE 102 may transmit only one PUCCH on a PUCCH reporting cell. If the PUCCH for HARQ-ACK supports more than 2 bits, and can append SR bits to HARQ-ACK, the HARQ-ACK and SR may be jointly reported on a HARQ-ACK PUCCH resource. If the PUCCH for HARQ-ACK supports up to 2 bits, and multiple SR bits are reported, the UE 102 may choose a different PUCCH resource and/or format with higher payload to jointly report HARQ-ACK and SR on the PUCCH resource and/or format with higher payload.

If joint SR and HARQ-ACK on a single PUCCH is not possible, the UE 102 may transmit only one PUCCH based on the priority rule, with priority order from highest to lowest is as follows: HARQ-ACK for higher priority traffic, SR for higher priority traffic, HARQ-ACK for lower priority traffic, SR for lower priority traffic, CSI for higher priority traffic, and CSI for lower priority traffic. If SR with a high priority traffic request (e.g., URLLC) collides with a HARQ-ACK feedback for low priority traffic (e.g., eMBB), the SR with the high priority traffic request may be transmitted, and the HARQ-ACK feedback for the low priority traffic may be dropped. If SR with a low priority traffic request (e.g., eMBB) collides with a HARQ-ACK feedback for low priority traffic (e.g., eMBB), the SR with the low priority traffic request may be dropped, and the HARQ-ACK feedback for low priority traffic may be transmitted.

The UE 102 may transmit 1708 UCI on the selected channel.

Figure 18:
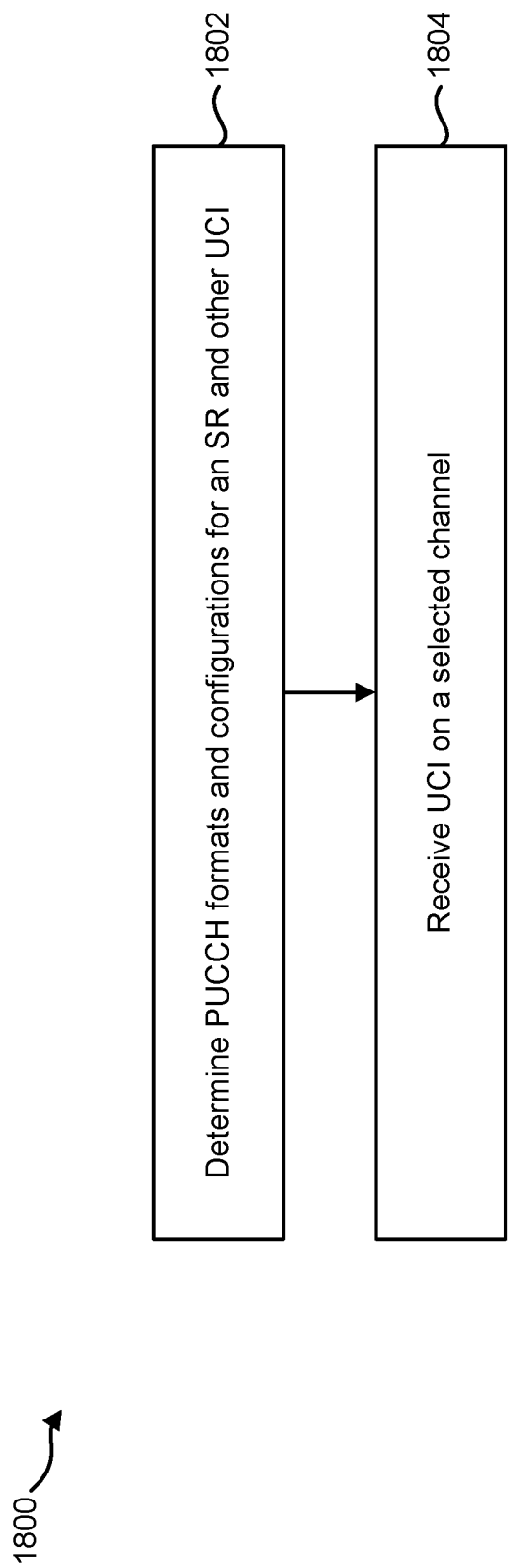
FIG. 18 is a flow diagram illustrating another method for implementing short PUCCH formats and SR transmission for 5G NR.

FIG. 18 is a flow diagram illustrating another method 1800 for implementing a short PUCCH design for 5G NR. The method 1800 may be implemented by a base station (gNB) 160. The gNB 160 may determine 1802 uplink control channel (PUCCH) formats and configurations for a scheduling request (SR) and other uplink control information (UCI). This may be accomplished as described in connection with FIG. 17. For example, the PUCCH format and configuration may include at least a short PUCCH format and a long PUCCH format. The short PUCCH format and long PUCCH format may have the same or different waveforms and/or numerologies.

In an implementation, the resource for a SR transmission may be based on a PUCCH in short duration with one or two symbols. A set of sequences may be configured on a SR resource to carry multiple SR bits. A demodulation reference signal (DMRS) pattern with 6 RS and 6 UCI carrying resource elements may be used for the SR resource. In a 2-symbol SR resource, one symbol SR format may be repeated with the same information in two symbols with frequency diversity.

In another implementation, the resource for a SR transmission is configured on a PUCCH in long duration. The determined PUCCH formats and resource may include the configured PUCCH resource for SR or HARQ-ACK, and an adaptive PUCCH format and resource with higher payload in case of joint SR and other UCI reporting.

The gNB 160 may receive 1804 UCI on a selected channel. A control channel used for uplink control information (UCI) feedback and a resource of the control channel for UCI feedback may be determined by a UE 102 based on signaling from the gNB 160. The selected channel may be a configured PUCCH resource for SR or HARQ-ACK. The selected channel may be an adaptive PUCCH channel with higher payload in case of joint SR and other UCI reporting. The gNB 160 may try to decode the received signal with different hypotheses, and determine the actual PUCCH channel carrying the SR and/or other UCI.

Figure 19:
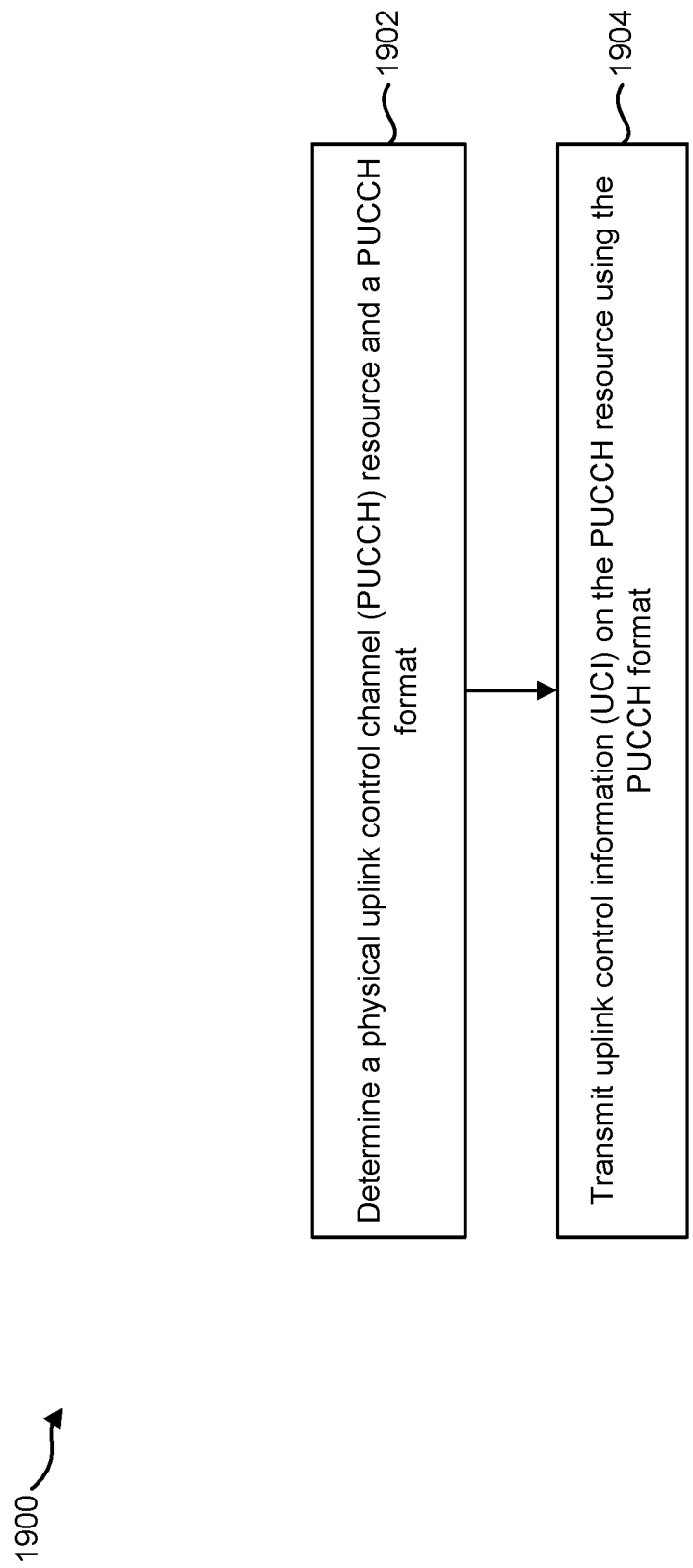
FIG. 19 is a flow diagram illustrating a communication method of a user equipment (UE)

FIG. 19 is a flow diagram illustrating a communication method 1900 of a user equipment (UE) 102. The UE 102 may determine 1902 a physical uplink control channel (PUCCH) resource and a PUCCH format. The UE 102 may transmit 1904 uplink control information (UCI) on the PUCCH resource using the PUCCH format. If the PUCCH format is a 2-symbol short PUCCH, 1-symbol PUCCH structure may be used in each symbol, and if the UCI is up to 2 bits, the UCI may be repeated in two symbols using repetition of a 1-symbol PUCCH. If the PUCCH format is a 2-symbol short PUCCH, and if the UCI is more than 2 bits, the UCI may be jointly encoded, and the encoded UCI bits may be distributed across two symbols.

Figure 20:
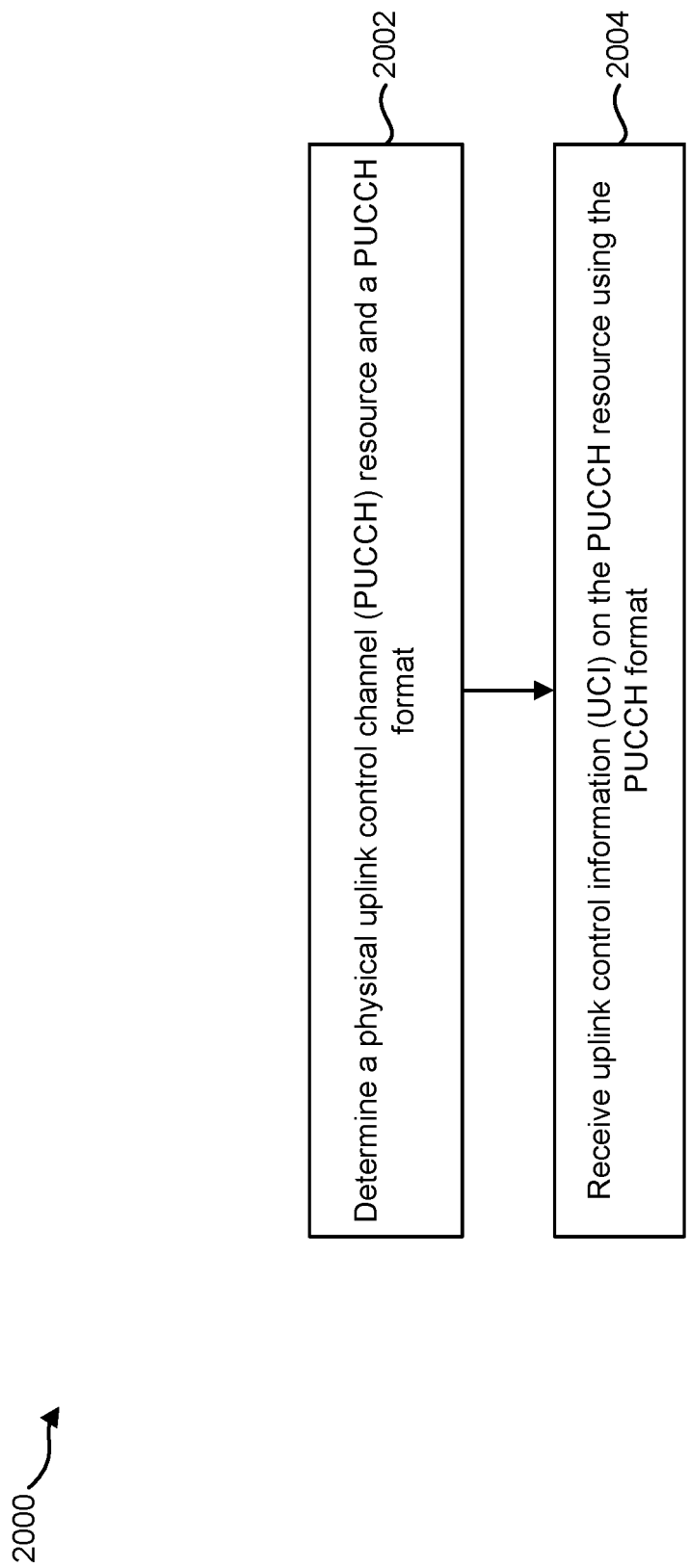
FIG. 20 is a flow diagram illustrating a communication method of a base station apparatus (gNB).

FIG. 20 is a flow diagram illustrating a communication method 2000 of a base station apparatus (gNB) 160. The gNB 160 may determine 2002 a physical uplink control channel (PUCCH) resource and a PUCCH format. The gNB 160 may receive 2004 uplink control information (UCI) on the PUCCH resource using the PUCCH format. If the PUCCH format is a 2-symbol short PUCCH, 1-symbol PUCCH structure may be used in each symbol, and if the UCI is up to 2 bits, the UCI may be repeated in two symbols using repetition of a 1-symbol PUCCH. If the PUCCH format is a 2-symbol short PUCCH, and if the UCI is more than 2 bits, the UCI may be jointly encoded, and the encoded UCI bits may be distributed across two symbols.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
a processor; and
a memory in electronic communication with the processor, wherein instructions stored in the memory are executable to:
determine a physical uplink control channel (PUCCH) resource and a PUCCH format; and
transmit uplink control information (UCI) on the PUCCH resource using the PUCCH format, wherein
in a case where the PUCCH format is a 2-symbol PUCCH and is up to 2 bits, the UCI is repeated in two symbols using repetition of a 1-symbol PUCCH, and
in a case where the PUCCH format is a 2-symbol PUCCH and is more than 2 bits, the UCI is jointly encoded, the encoded UCI bits are distributed across two symbols, and if the UCI includes HARQ-ACK and scheduling request (SR), SR bits are appended to HARQ-ACK bits and the HARQ-ACK bits and the SR bits are jointly encoded.

2. A base station, comprising:
a processor; and
a memory in electronic communication with the processor, wherein instructions stored in the memory are executable to:

determine a physical uplink control channel (PUCCH) resource and a PUCCH format; and receive uplink control information (UCI) on the PUCCH resource using the PUCCH format, wherein in a case where the PUCCH format is a 2-symbol PUCCH and is up to 2 bits, the UCI is repeated in two symbols using repetition of a 1-symbol PUCCH, and in a case where the PUCCH format is a 2-symbol PUCCH and is more than 2 bits, the UCI is jointly encoded, the encoded UCI bits are distributed across two symbols, and if the UCI includes HARQ-ACK and scheduling request (SR), SR bits are appended to HARQ-ACK bits and the HARQ-ACK bits and the SR bits are jointly encoded.

3. A method for a user equipment (UE), the method comprising:

determining a physical uplink control channel (PUCCH) resource and a PUCCH format; and transmitting uplink control information (UCI) on the PUCCH resource using the PUCCH format, wherein in a case where the PUCCH format is a 2-symbol PUCCH and is up to 2 bits, the UCI is repeated in two symbols using repetition of a 1-symbol PUCCH, and in a case where the PUCCH format is a 2-symbol PUCCH and is more than 2 bits, the UCI is jointly encoded, the encoded UCI bits are distributed across two symbols, and if the UCI includes HARQ-ACK and scheduling request (SR), SR bits are appended to HARQ-ACK bits and the HARQ-ACK bits and the SR bits are jointly encoded.

4. A method for a base station, the method comprising:

determining a physical uplink control channel (PUCCH) resource and a PUCCH format; and receiving uplink control information (UCI) on the PUCCH resource using the PUCCH format, wherein in a case where the PUCCH format is a 2-symbol PUCCH and is up to 2 bits, the UCI is repeated in two symbols using repetition of a 1-symbol PUCCH, and in a case where the PUCCH format is a 2-symbol PUCCH and is more than 2 bits, the UCI is jointly encoded, the encoded UCI bits are distributed across two symbols, and if the UCI includes HARQ-ACK and scheduling request (SR), SR bits are appended to HARQ-ACK bits and the HARQ-ACK bits and the SR bits are jointly encoded.

* * * * *